(12) United States Patent
Segawa

(10) Patent No.: US 8,732,484 B2
(45) Date of Patent: *May 20, 2014

(54) INFORMATION PROCESSING APPARATUS, SOFTWARE UPDATING METHOD, AND IMAGE PROCESSING APPARATUS

(71) Applicant: Hidekazu Segawa, Kanagawa (JP)

(72) Inventor: Hidekazu Segawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/675,085

(22) Filed: Nov. 13, 2012

(65) Prior Publication Data

US 2013/0073869 A1    Mar. 21, 2013

Related U.S. Application Data

(63) Continuation of application No. 12/046,858, filed on Mar. 12, 2008, now Pat. No. 8,347,107.

(30) Foreign Application Priority Data

Mar. 15, 2007   (JP) .................................. 2007-067251

(51) Int. Cl.
    *H04L 29/06*      (2006.01)
(52) U.S. Cl.
    USPC .......................................................... 713/191
(58) Field of Classification Search
    USPC ................................................. 713/190, 191
    See application file for complete search history.

(56) References Cited

U.S. PATENT DOCUMENTS

| 5,915,025 | A | 6/1999 | Taguchi et al. | |
|---|---|---|---|---|
| 2003/0037231 | A1* | 2/2003 | Goodman et al. | 713/2 |
| 2005/0166024 | A1* | 7/2005 | Angelo et al. | 711/164 |
| 2006/0161784 | A1* | 7/2006 | Hunter et al. | 713/182 |
| 2008/0226065 | A1* | 9/2008 | Zunke | 380/30 |

FOREIGN PATENT DOCUMENTS

| EP | 1679634 A2 | 7/2006 |
|---|---|---|
| JP | 9-258977 | 10/1997 |
| JP | 2004-282391 | 10/2004 |
| JP | 2005-196745 | 7/2005 |
| JP | 2006-146748 | 6/2006 |
| JP | 2006-323814 | 11/2006 |
| JP | 2007-52618 | 3/2007 |

OTHER PUBLICATIONS

"TCG Specification Architecture Overview", Revision 1.2, Apr. 28, 2004.

(Continued)

*Primary Examiner* — Ali Abyaneh
(74) *Attorney, Agent, or Firm* — Cooper & Dunham LLP

(57) ABSTRACT

An information processing apparatus which updates a basic software package is disclosed. The information processing apparatus includes an encryption and decryption unit which stores values calculated uniquely from software and encrypts information based on the calculated values and decrypts encrypted information based on the calculated values. The basic software package includes a firmware authenticating module for authenticating a firmware updating file which includes new software for updating the basic software package, a value uniquely calculated from the new software, and a public key signature. The information processing apparatus further includes a software updating module which updates the basic software package by using the authenticated firmware updating file, and an encryption key managing module for encrypting again the information encrypted by the values based on a value changed by updating the basic software package.

10 Claims, 22 Drawing Sheets

(56) References Cited

OTHER PUBLICATIONS

Information Security and Privacy: Technologies for "Trusted Computers" by Hiroshi Maruyama, IBM Japan Ltd., Provision No. 42, vol. 12, No. 3, pp. 21-24, Jul. 30, 2004 (partial translation).

European search report dated Aug. 22, 2008 in connection with corresponding European patent application No. 08152602.0.

IPSJ SIG Technical Report: "Trusted Platform on demand" by Hiroshi Maruyama, et al., Information Processing Society of Japan, vol. 2004, No. 22, p. 181-186, Mar. 5, 2004 (with English Abstract).

* cited by examiner

FIG.9

```
PCR
index:0
value:
00ABCE458300ABCE4
58300ABCE458300ABC
E458300ABCE4583
```
~91

US 8,732,484 B2

INFORMATION PROCESSING APPARATUS, SOFTWARE UPDATING METHOD, AND IMAGE PROCESSING APPARATUS

CROSS-REFERENCE TO RELATED APPLICATIONS

This application is a Rule 1.53(b) continuation of U.S. patent application Ser. No. 12/046,858 filed Mar. 12, 2008 which claims the priority of Japanese patent applications no. 2007-067251 filed with the Japan Patent Office on Mar. 15, 2007.

BACKGROUND OF THE INVENTION

1. Field of the Invention

The present invention generally relates to an information processing apparatus, a software updating method in the information processing apparatus, an image processing apparatus, and a software updating method in the image processing apparatus.

2. Description of the Related Art

In an information processing apparatus such as a PC (personal computer) and an image processing apparatus such as an MFP (multifunctional peripheral) in which security of information is maintained, secret information in the apparatus must be secured. Currently, in order to maintain the security of the information in the apparatus, secret information stored in the apparatus is encrypted so as to prevent the information from being falsified or compromised.

For example, in Patent Document 1, in a PC based on a TCPA (trusted computing platform alliance) standard, information is encrypted by using a TPM (trusted platform module). By using the TPM, secret information in the information processing apparatus and the image processing apparatus can be encrypted. The TPM can be realized by, for example, a chip directly mounted on a mother board. The security of the secret information is generally maintained by management information such as a password by which a specific user is identified.

In addition, in Patent Document 2, in order to handle a bug or a security hole in a program, or to respond to an addition and/or a change of a function in an apparatus, a program is updated.

[Patent Document 1] Japanese Laid-Open Patent Application No. 2004-282391
[Patent Document 2] Japanese Laid-Open Patent Application No. 2005-196745

However, when only a specific user such as a manger has a password, the other users cannot handle the secret information. That is, when a user desires to start up an information processing apparatus, since the user does not have a password, the user cannot operate the apparatus.

In addition, when the information processing apparatus is started up, in order to maintain the secret information, software (system) in the apparatus must be authenticated.

In order to solve the above problems, a hash value calculated by firmware in the apparatus is registered in a PCR (platform configuration register) in the TPM, and the hash value registered in the PCR is determined to be a condition for decrypting the secret information. With this, the secret information in the information processing apparatus and the image processing apparatus is prevented from being compromised or falsified due to a user violation.

However, when the firmware is updated, it is difficult to confirm the authentication of the hash value calculated by the firmware.

In addition, when the firmware is updated, it can be considered that the hash value registered in the PCR is recalculated. However, there is a risk of an interface for instructing the recalculation becoming a reason for weakness of the apparatus.

SUMMARY OF THE INVENTION

In a preferred embodiment of the present invention, there is provided an information processing apparatus, a software updating method in the information processing apparatus, an image processing apparatus, and a software updating method in the image processing apparatus, in which software in the apparatus can be easily updated and security of information in the apparatus can be easily maintained.

Features and advantages of the present invention are set forth in the description that follows, and in part will become apparent from the description and the accompanying drawings, or may be learned by practice of the invention according to the teachings provided in the description. Features and advantages of the present invention will be realized and attained by an information processing apparatus, a software updating method in the information processing apparatus, an image processing apparatus, and a software updating method in the image processing apparatus particularly pointed out in the specification in such full, clear, concise, and exact terms so as to enable a person having ordinary skill in the art to practice the invention.

To achieve one or more of these and other advantages, according to one aspect of the present invention, there is provided an information processing apparatus which updates software in the apparatus. The information processing apparatus includes an encryption and decryption unit which stores a value uniquely calculated from the software and encrypts information by using the value and decrypts the encrypted information by using the value, an authenticating unit which authenticates a software updating file, a software updating unit which updates the software by using the authenticated software updating file, and an encryption key managing unit which controls encrypting again the information encrypted by the value by using a value which is changed based on the update of the software.

According to another aspect of the present invention, there is provided an image processing apparatus which includes a plotting section and a scanning section and updates software in the apparatus. The image processing apparatus includes an encryption and decryption unit which stores a value uniquely calculated from the software and encrypts information by using the value and decrypts the encrypted information by using the value, an authenticating unit which authenticates a software updating file, a software updating unit which updates the software by using the authenticated software updating file, and an encryption key managing unit which controls encrypting again the information encrypted by the value by using a value which is changed based on the update of the software.

Effect of the Invention

According to an embodiment of the present invention, in an information processing apparatus which updates software in the apparatus, software in the apparatus can be easily updated and security of information in the apparatus can be easily maintained.

BRIEF DESCRIPTION OF THE DRAWINGS

Features and advantages of the present invention will become more apparent from the following detailed description when read in conjunction with the accompanying drawings, in which:

FIG. 9 is a diagram showing an example of a structure of a field of a PCR value shown in FIG. 8;

DESCRIPTION OF THE PREFERRED EMBODIMENT

Best Mode of Carrying Out the Invention

The best mode of carrying out the present invention is described with reference to the accompanying drawings.

In an embodiment of the present invention, an information processing apparatus, for example, a PC is used. However, the embodiment of the present invention can be applied to an image processing apparatus, for example, an MFP. In case of the image processing apparatus, the image processing apparatus includes a plotter and a scanner.

Figure 1:
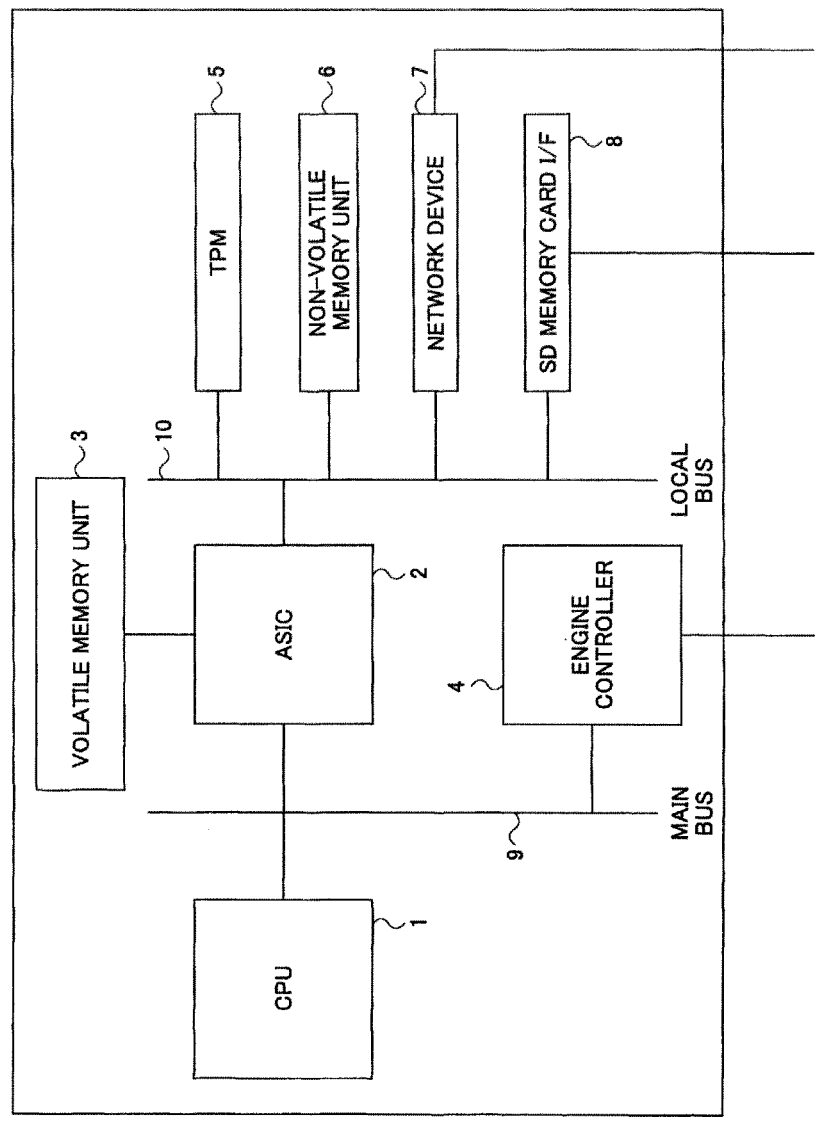
FIG. 1 is a diagram showing a hardware structure of an information processing apparatus according to an embodiment of the present invention.

FIG. 1 is a diagram showing a hardware structure of an information processing apparatus according to the embodiment of the present invention. As shown in FIG. 1, the information processing apparatus includes a CPU (central processing unit) 1, an ASIC (application specific integrated circuit) 2, a volatile memory unit 3, an engine controller 4, a TPM 5, a non-volatile memory unit 6, a network device 7, and an SD memory card I/F (interface) 8.

The CPU 1 is connected to the ASIC 2 and the engine controller 4 via a main bus 9. The ASIC 2 is connected to the volatile memory unit 3 and is also connected to the TPM 5, the non-volatile memory unit 6, the network device 7, and the SD memory card I/F 8 via a local bus 10.

The TPM 5 can provide functions for encrypting secret information and decrypting encrypted secret information and for authenticating a platform (software) in the information processing apparatus.

Figure 2:
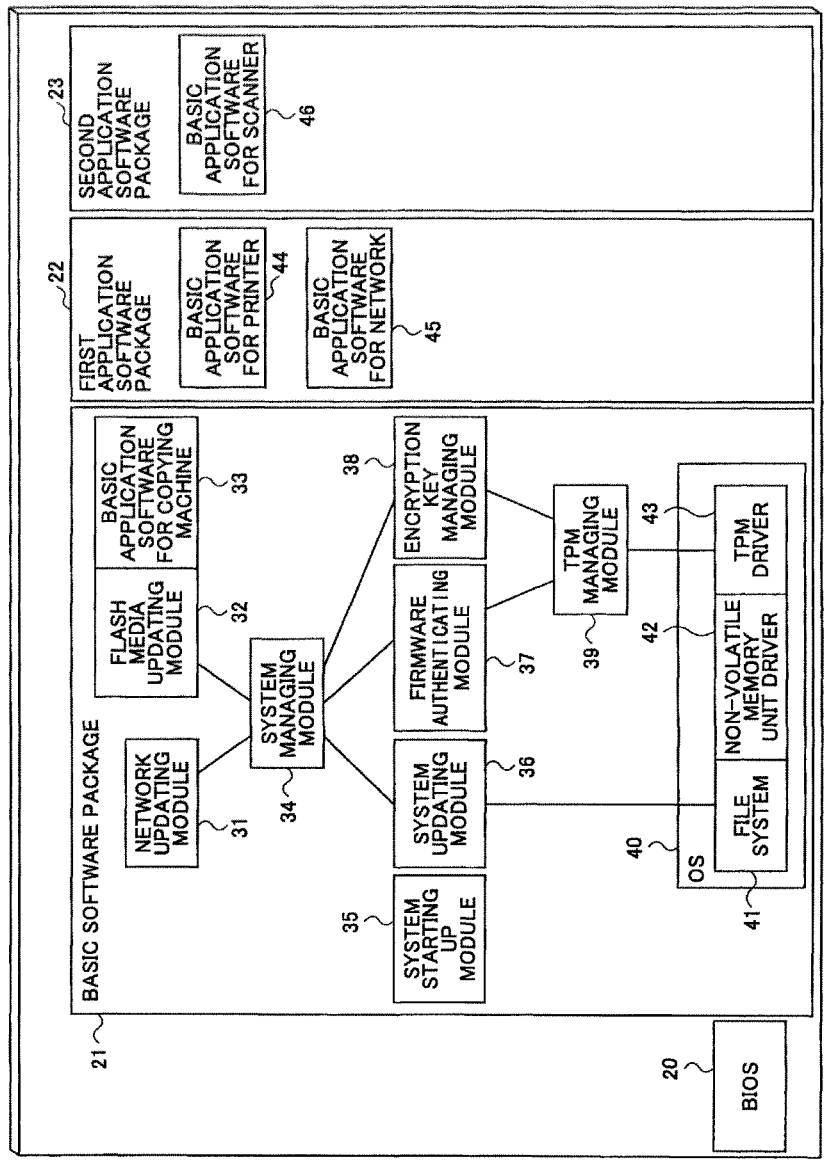
FIG. 2 is a diagram showing a software structure of the information processing apparatus according to the embodiment of the present invention.

FIG. 2 is a diagram showing a software structure of the information processing apparatus according to the embodiment of the present invention. As shown in FIG. 2, the information processing apparatus includes a BIOS (basic input/output system) 20, a basic software package 21, a first application software package 22, and a second application software package 23.

The basic software package 21 includes a network updating module 31, a flash media updating module 32, a basic application software for copying machine 33, a system managing module 34, a system starting up module 35, a system updating module 36, a firmware authenticating module 37, an encryption key managing module 38, a TPM managing module 39, and an OS (operating system) 40. The OS 40 includes a file system 41, a non-volatile memory unit driver 42, and a TPM driver 43.

The first application software package 22 includes basic application software for printer 44 and basic application software for network 45. The second application software package 23 includes basic application software for scanner 46.

The BIOS 20 is a module which works when starting up the apparatus, and can access the TPM 5. The OS 40 is basic software in the information processing apparatus and works when a module drives some hardware in the apparatus. The file system 41 manages data in the apparatus. The non-volatile memory unit driver 42 drives the non-volatile memory unit 6. The TPM diver 43 drives the TPM 5.

When the information processing apparatus is started up, the BIOS 20 starts up the OS 40. After starting up the OS 40, the system starting up module 35 is started up so as to start up modules (software) in the apparatus. The system starting up module 35 starts up the modules in the apparatus in predetermined order.

Modules (software) of the BIOS 20 and the OS 40 are read in the volatile memory unit 3 and are executed by the CPU 1. Operations of the information processing apparatus are described below in detail.

In the following, in order to make the description simple, the description of the second application software package 23 is omitted.

Figure 3:
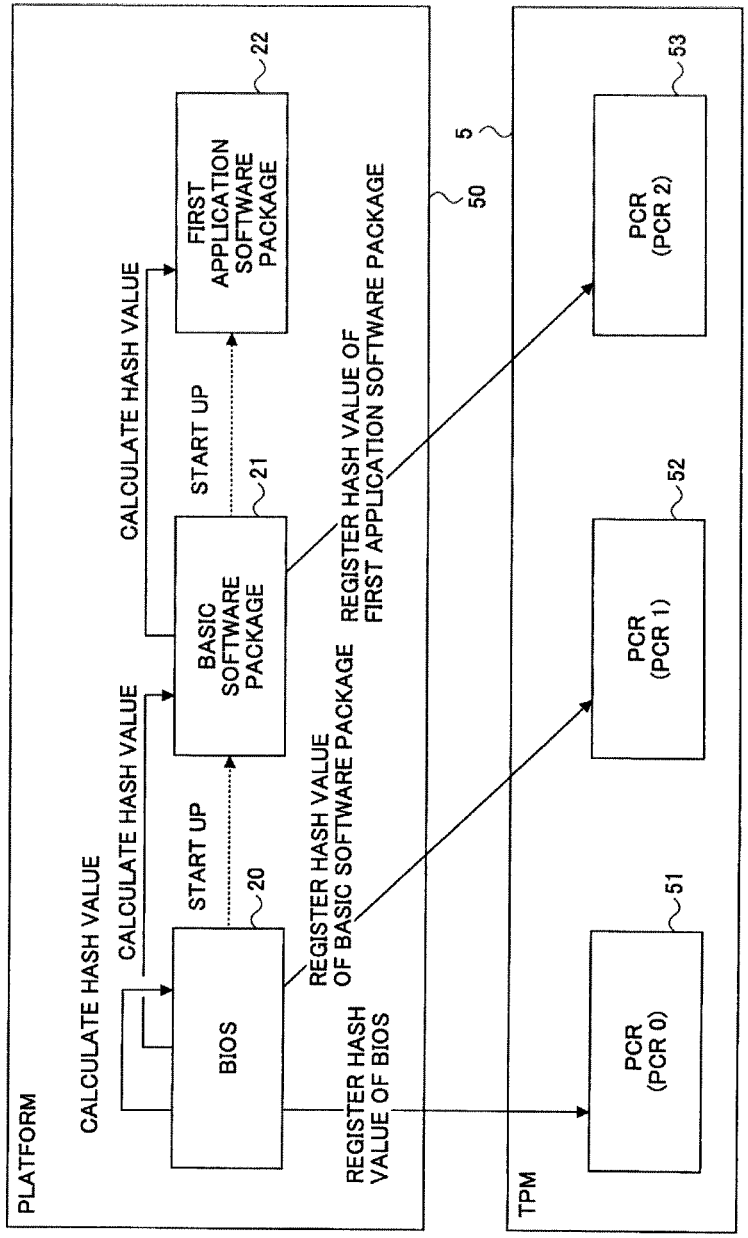
FIG. 3 is a schematic diagram showing operations of a TPM when the TPM in the information processing apparatus is started up.

Next, encryption and decryption of information by using the TPM 5 are briefly described. FIG. 3 is a schematic diagram showing operations of the TPM 5 when the TPM 5 is started up. In FIG. 3, a platform 50 is used. The platform 50 includes the BIOS 20, the basic software package 21, and the first application software package 22.

In the platform 50, first, the BIOS 20 calculates its own hash value and registers the hash value in a PCR 51 (PCR 0) of the TPM 5. The BIOS 20 calculates the hash value by using a hash function in which fixed length random numbers are generated from an original text.

Next, the BIOS 20 calculates a hash value of the basic software package 21, registers the hash value in a PCR 52 (PCR 1) of the TPM 5, and starts up the basic software package 21. Further, the basic software package 21 calculates a hash value of the first application software package 22, registers the hash value in a PCR 53 (PCR 2) of the TPM 5, and starts up the first application software package 22.

As described above, when the information processing apparatus is started up, the calculated hash values of the BIOS 20, the basic software package 21, and the first application software package 22 are registered in the corresponding PCRs 51, 52, and 53.

Figure 4:
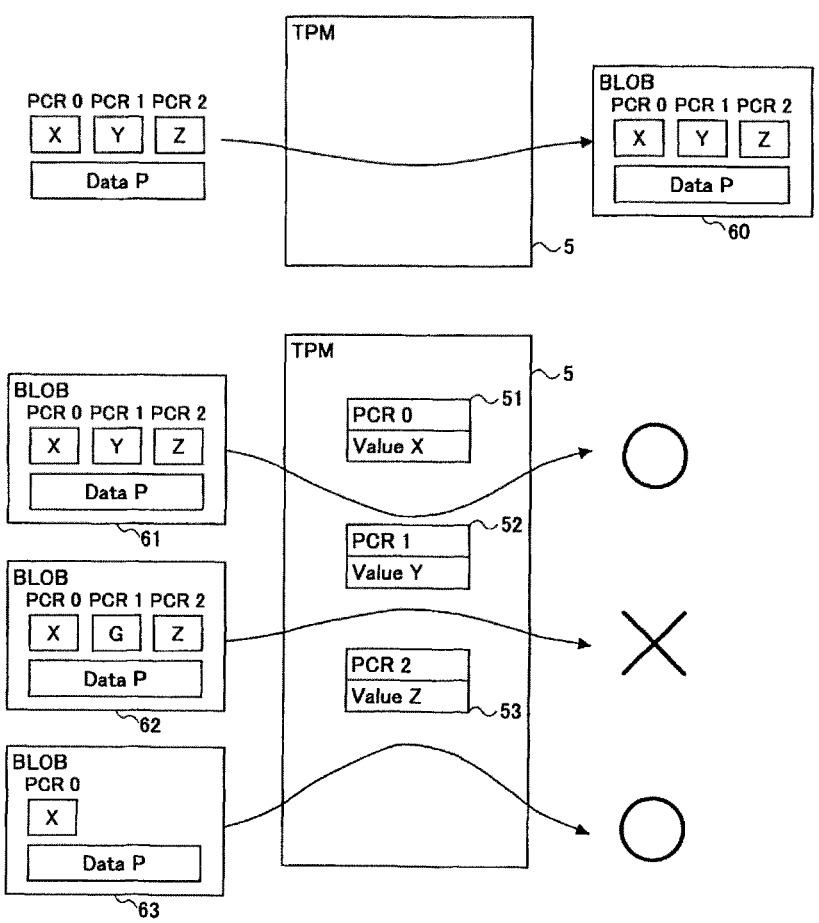
FIG. 4 is a schematic diagram showing encryption and decryption of information by using the TPM.

FIG. 4 is a schematic diagram showing encryption and decryption of information by using the TPM 5. In FIG. 4, the upper part shows encryption of information "Data P" by the TPM 5. The TPM 5 forms a BLOB (binary large object) 60 based on the information "Data P", and hash values X, Y, and Z registered in the corresponding PCR 0, PCR 1, and PCR 2.

In FIG. 4, the lower part shows decryption of BLOBs 61, 62, and 63 by the TPM 5. As described above, when the information processing apparatus is started up, the three calculated hash values X, Y, and Z of the BIOS 20, the basic software package 21, and the first application software package 22 are registered in the corresponding PCR 51, PCR 52, and PCR 53 of the TPM 5.

The file system 41 manages the BLOBs 61 through 63 which include the information "Data P". In the BLOB 61, for example, the calculated hash values X, Y, and Z have been registered in the corresponding PCR 0, PCR 1, and PCR 2. In the BLOB 62, for example, the calculated hash values X, G, and Z have been registered in the corresponding PCR 0, PCR 1, and PCR 2. In addition, in the BLOB 63, for example, the calculated hash value X has been registered in the PCR 0.

The hash values registered in the PCR 0 through PCR 2 of the BLOB 61 are the same as the hash values registered in the PCR 51 through PCR 53 of the TPM 5. Therefore, the TPM 5 permits extracting the information "Data P" from the BLOB 61. In addition, the hash values registered in the PCR 0 through PCR 2 of the BLOB 62 are not the same as the hash values registered in the PCR 51 through PCR 53 of the TPM 5. Therefore, the TPM 5 does not permit extracting the information "Data P" from the BLOB 62.

In addition, the hash value registered in the PCR 0 of the BLOB 63 is the same as the hash value registered in the PCR 51 of the TPM 5. Therefore, the TPM 5 permits extracting the information "Data P" from the BLOB 63. In the BLOB 63, hash values have not been registered in the PCR 1 and PCR 2. However, the TPM 5 does not use the PCR 1 and PCR 2 for determining the permission for extracting the information "Data P".

In the information processing apparatus of the embodiment of the present invention, the platform 50 further includes the file system 41, and the file system 41 includes an encrypted BLOB 70 which includes a device encryption key 71. Hereinafter, the BLOB 70 is referred to as an encryption key BLOB 70. That is, the platform 50 further includes the encryption key BLOB 70.

Figure 5:
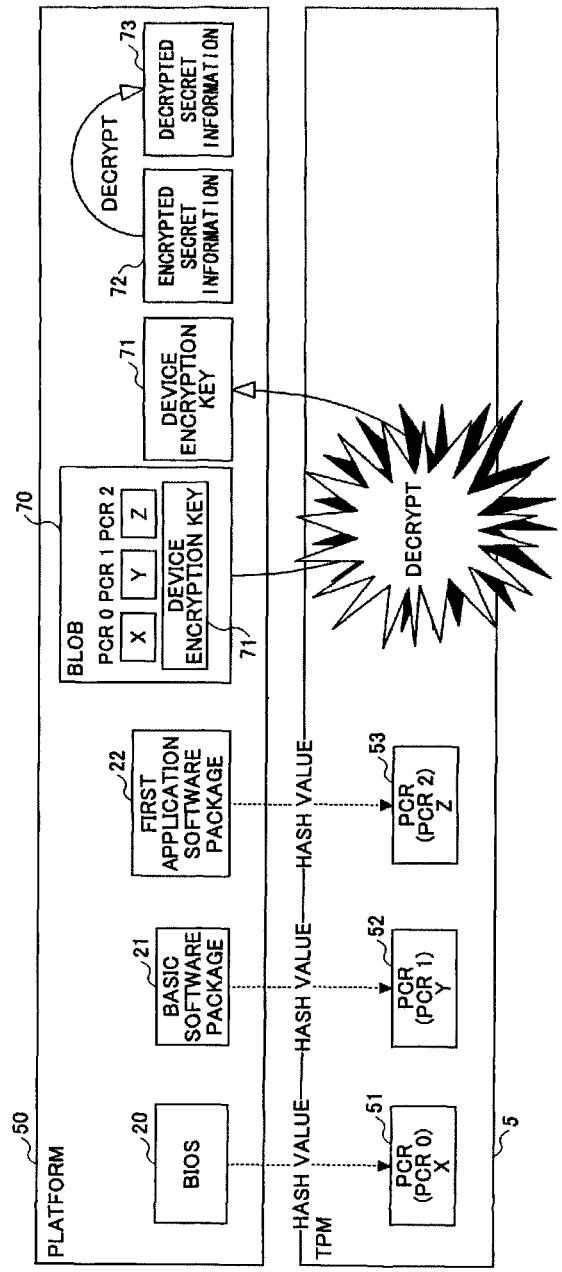
FIG. 5 is a schematic diagram showing operations for obtaining decrypted secret information when the information processing apparatus is started up.

FIG. 5 is a schematic diagram showing operations for obtaining decrypted secret information 73 when the information processing apparatus is started up. In FIG. 5, whether the encryption key BLOB 70 is decrypted is determined by the hash values registered in the PCR 51 through 53. The device encryption key 71 is used to encrypt secret information in the file system 41 or decrypt encrypted secret information.

In FIG. 5, as described above, when the information processing apparatus is started up, the calculated hash values X, Y, and Z of the BIOS 20, the basic software package 21, and the first application software package 22 are registered in the corresponding PCRs 51, 52, and 53 of the TPM 5.

In the encryption key BLOB 70, the hash values X, Y, and Z have been registered in the corresponding PCR 0 through PCR 2. The hash values registered in the PCR 0 through PCR 2 of the encryption key BLOB 70 are the same as the hash values registered in the PCR 51 through PCR 53 of the TPM 5. Therefore, the TPM 5 decrypts the device encryption key 71 from the encryption key BLOB 70. The encryption key managing module 38 decrypts encrypted secret information 72 by using the device encryption key 71 and obtains the decrypted secret information 73.

Figure 6:
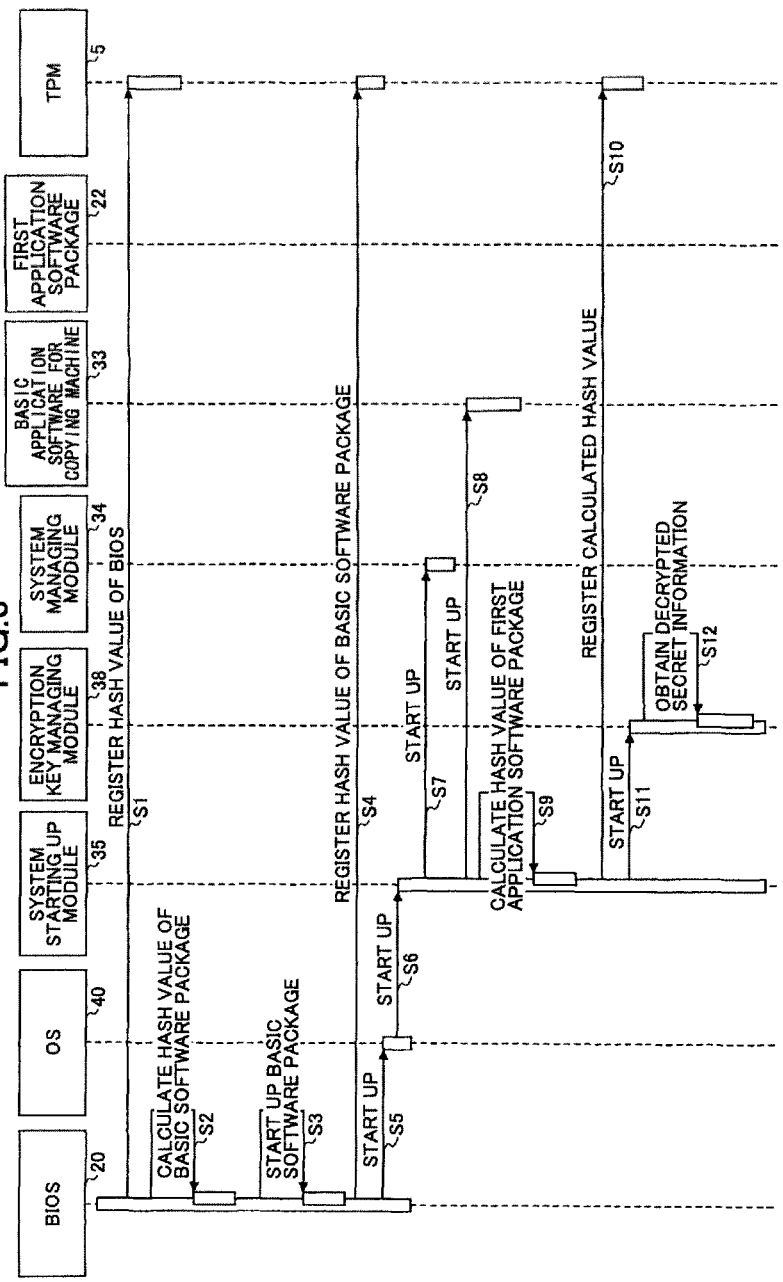
FIG. 6 is a sequence chart showing processes for obtaining the decrypted secret information when the information processing apparatus is started up.

FIG. 6 is a sequence chart showing processes for obtaining the decrypted secret information 73 when the information processing apparatus is started up.

Referring to FIG. 6, the processes for obtaining the decrypted secret information 73 are described. First, the BIOS 20 calculates its own hash value and registers the calculated hash value in the PCR 51 of the TPM 5 (S1). Next, the BIOS 20 calculates a hash value of the basic software package 21 (S2). Then the BIOS 20 starts up the basic software package 21 (S3). The BIOS 20 registers the calculated hash value of the basic software package 21 in the PCR 52 of the TPM 5 (S4). The BIOS 20 starts up the OS 40 (S5).

The OS 40 starts up the system starting up module 35 (S6). The system starting up module 35 starts up the system managing module 34 (S7). In addition, the system starting up module 35 starts up the basic application software for copying machine 33 (S8).

The system starting up module 35 calculates a hash value of the first application software package 22 (S9), and registers the calculated hash value in the PCR 53 of the TPM 5 (S10).

The system starting up module 35 starts up the encryption key managing module 38 (S11). The encryption key managing module 38 decrypts the encryption key BLOB 70, obtains the device encryption key 71, decrypts the encrypted secret information 72, and obtains the decrypted secret information 73 by using the obtained device encryption key 71 (S12).

In this, after registering the calculated hash values of the BIOS 20, the basic software package 21, and the first application software package 22 in the corresponding PCRs 51, 52, and 53 of the TPM 5, the TPM 5 receives a request to decrypt the encryption key BLOB 70. The encryption key managing module 38 requests the TPM 5 to decrypt the encryption key BLOB 70 at a timing when the TPM 5 receives the request to decrypt the encryption key BLOB 70. Then the encryption key managing module 38 obtains the device encryption key 71 from the decrypted encryption key BLOB 70.

Figure 7:
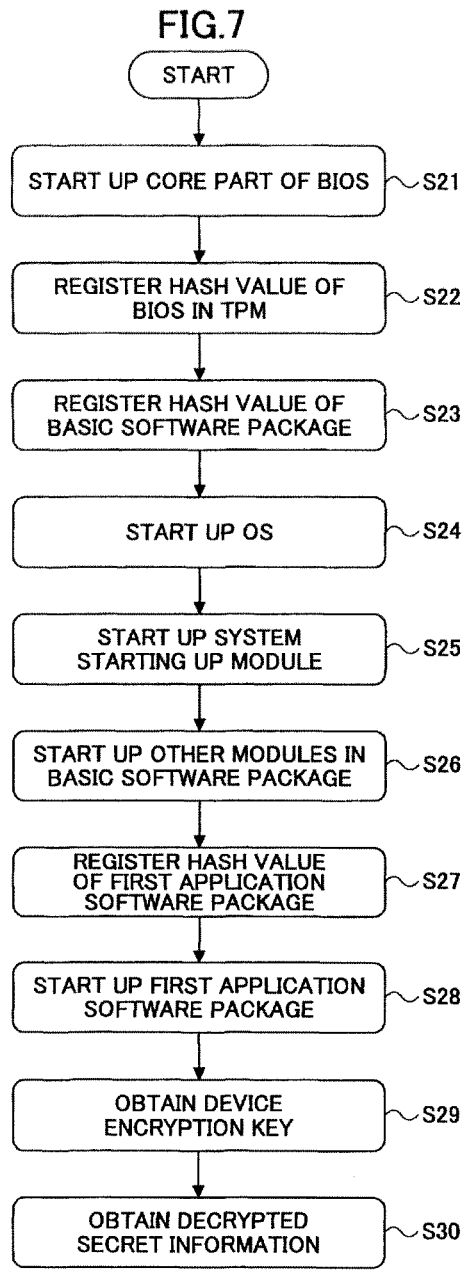
FIG. 7 is a flowchart showing processes for obtaining the decrypted secret information when the information processing apparatus is started up.

FIG. 7 is a flowchart showing processes for obtaining the decrypted secret information 73 when the information processing apparatus is started up.

In FIG. 7, first, the core part of the BIOS 20 is started up (S21). The core part of the BIOS 20 calculates its own hash value and registers the calculated hash value in the PCR 51 of the TPM 5 (S22). Then all parts of the BIOS 20 are started up.

Next, the BIOS 20 calculates a hash value of the basic software package 21, and registers the calculated hash value of the basic software package 21 in the PCR 52 of the TPM 5 (S23). The BIOS 20 starts up the OS 40 (S24).

The OS 40 starts up the system starting up module 35 (S25). Then the system starting up module 35 starts up the other modules in the basic software package 21 (S26). The system starting up module 35 calculates a hash value of the first application software package 22, and registers the calculated hash value in the PCR 53 of the TPM 5 (S27).

The system starting up module 35 starts up the first application software package 22 (S28). The encryption key managing module 38 obtains the device encryption key 71 from the encryption key BLOB 70 by using the TPM 5 (S29). The encryption key managing module 38 decrypts the encrypted secret information 72 and obtains the decrypted secret information 73 by using the device encryption key 71 (S30).

Next, processes to update firmware while maintaining the authentication of the hash values calculated by the firmware are described.

The firmware is software in the image processing apparatus and includes the software in the basic software package 21, the first application software package 22, and the second application software package 23.

Figure 8:
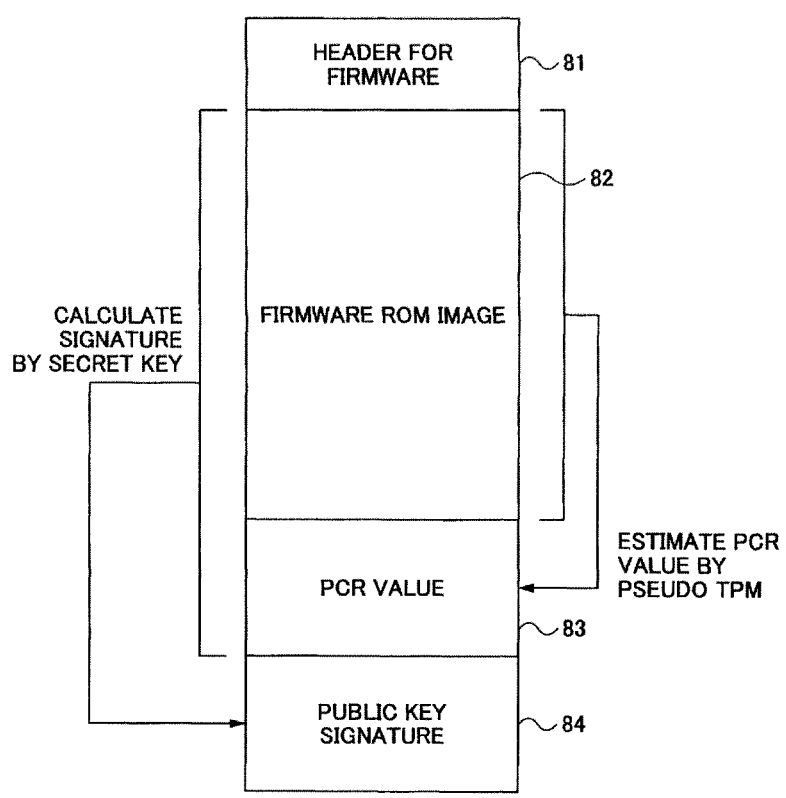
FIG. 8 is a diagram showing a structure of a firmware updating file which is used to update firmware.

FIG. 8 is a diagram showing a structure of a firmware updating file which is used to update firmware. As shown in FIG. 8, a firmware updating file 80 has fields corresponding to a header for firmware 81, a firmware ROM image 82, a PCR value 83, a public key signature 84.

The field of the header for firmware 81 stores information concerning the firmware updating file 80. The field of the firmware ROM image 82 stores new firmware for updating existing firmware. The field of the PCR value 83 stores, for example, a field shown in FIG. 9. FIG. 9 is a diagram showing an example of a structure of the field of the PCR value 83.

A hash value (PCR value) calculated from the firmware ROM image 82 is stored in the field of the PCR value 83. The PCR value can be obtained from estimation by using a pseudo TPM.

A field 91 of the PCR value shown in FIG. 9 includes an index of PCR, and an estimation value of the PCR value when the firmware is applied to the started up information processing apparatus. In FIG. 9, the field of the PCR value in the PCR 0 is shown. In order to prevent information from being falsified, the field of the public key signature 84 stores a digital signature for the firmware ROM image 82 and the PCR value 83 calculated from a secret key.

Figure 10:
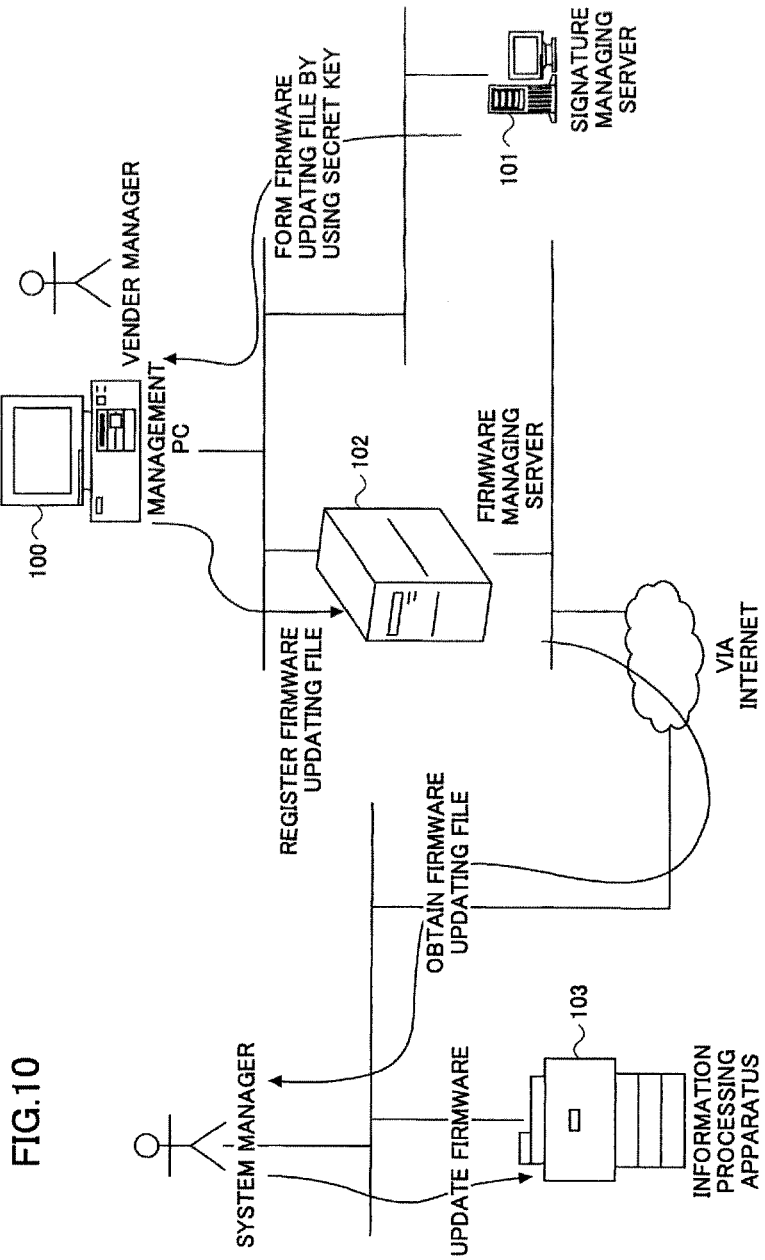
FIG. 10 is a schematic diagram showing a delivering system of the firmware updating file shown in FIG. 8.

FIG. 10 is a schematic diagram showing a delivering system of the firmware updating file 80. In FIG. 10, a vender manager accesses a signature managing server 101 having a secret key by operating a management PC 100, and forms the firmware updating file 80 by using the secret key. The vender manger registers the firmware updating file 80 in a firmware managing server 102 by operating the management PC 100.

A system manager (user) obtains the firmware updating file 80 from the firmware managing server 102 and updates firmware in an information processing apparatus 103 by using the obtained firmware updating file 80. The firmware managing server 102 confirms the user by using digital authentication. When the system manager obtains the firmware updating file 80 from the firmware managing server 102, the system manager can use the Internet.

Figure 11:
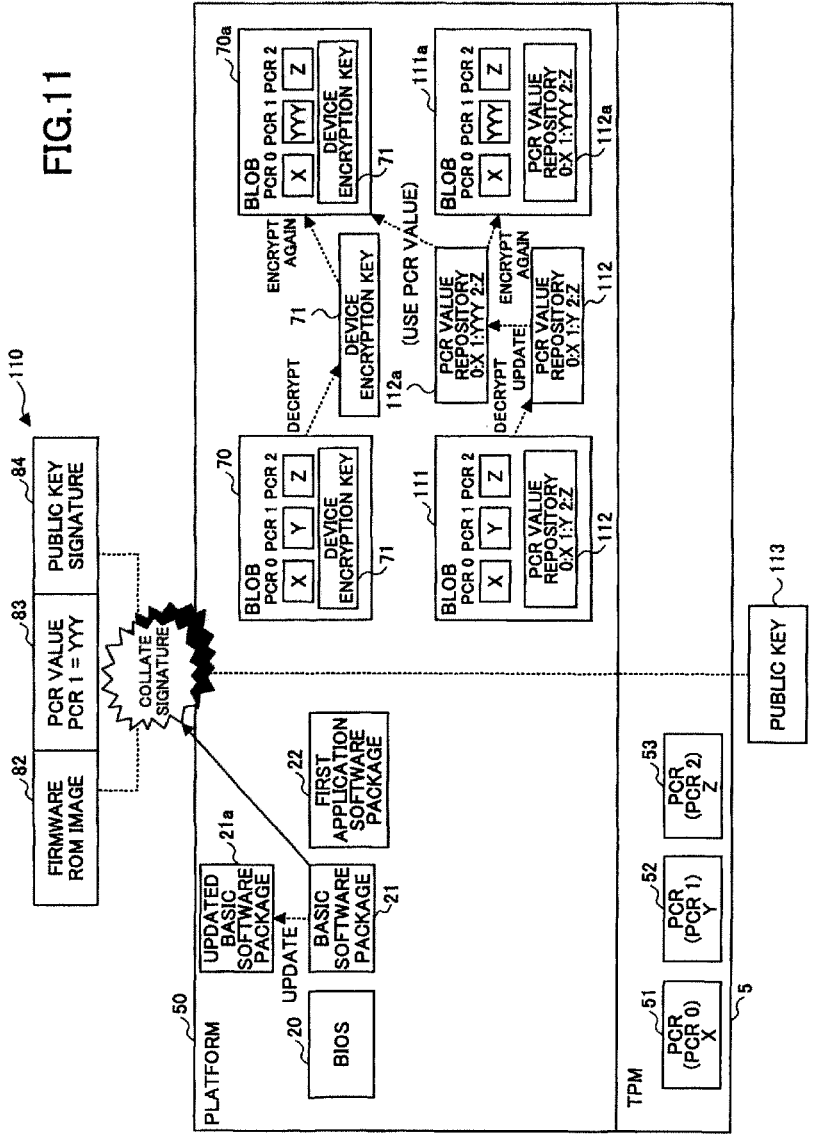
FIG. 11 is a schematic diagram showing processes to update firmware by using a first firmware updating file.

FIG. 11 is a schematic diagram showing processes to update firmware by using a first firmware updating file 110. In FIG. 11, as an example, the basic software package 21 is updated as the firmware, and the first firmware updating file 110 is used. In the first firmware updating file 110, the header for firmware 81 is omitted.

The first firmware updating file 110 confirms whether the public key signature 84 is valid by using a public key 113 stored in a falsification unable region of the information processing apparatus. The public key 113 is a key for authenticating firmware.

When the public key signature 84 is valid, it is determined that the first firmware updating file 110 is not falsified. The falsification unable region can be a memory region where the falsification is prevented.

When it is determined that the first firmware updating file 110 is not falsified, the basic software package 21 is updated to be an updated basic software package 21a by the firmware ROM image 82 of the first firmware updating file 110. When the updated basic software package 21a is formed, the hash value in the PCR 52 of the TPM 5 becomes a hash value of the updated basic software package 21a.

The encryption key BLOB 70 whose decryption is determined by the hash values registered in the PCRs 51 through 53, and a PCR value repository BLOB 111 which includes a PCR value repository 112, must be encrypted again based on the hash value calculated from the updated basic software package 21a.

Therefore, in the information processing apparatus, first, the encryption key BLOB 70 is decrypted, the device encryption key 71 is obtained by using the TPM 5, the PCR value repository BLOB 111 is decrypted, and the PCR value repository 112 is obtained by using the TPM 5.

The PCR value repository 112 is updated to be a PCR value repository 112a by a PCR value "YYY" in the PCR value 83 of the first firmware updating file 110. The values in the PCR value repository 112a become hash values in the corresponding PCRs 51 through 53 of the TPM 5.

The information processing apparatus decrypts again the device encryption key 71 by using the PCR values in the PCR value repository 112a and obtains an encryption key BLOB 70a. In addition, the information processing apparatus decrypts again the PCR value repository 112a by using the PCR values in the PCR value repository 112a and obtains a PCR value repository BLOB 111a.

Figure 12:
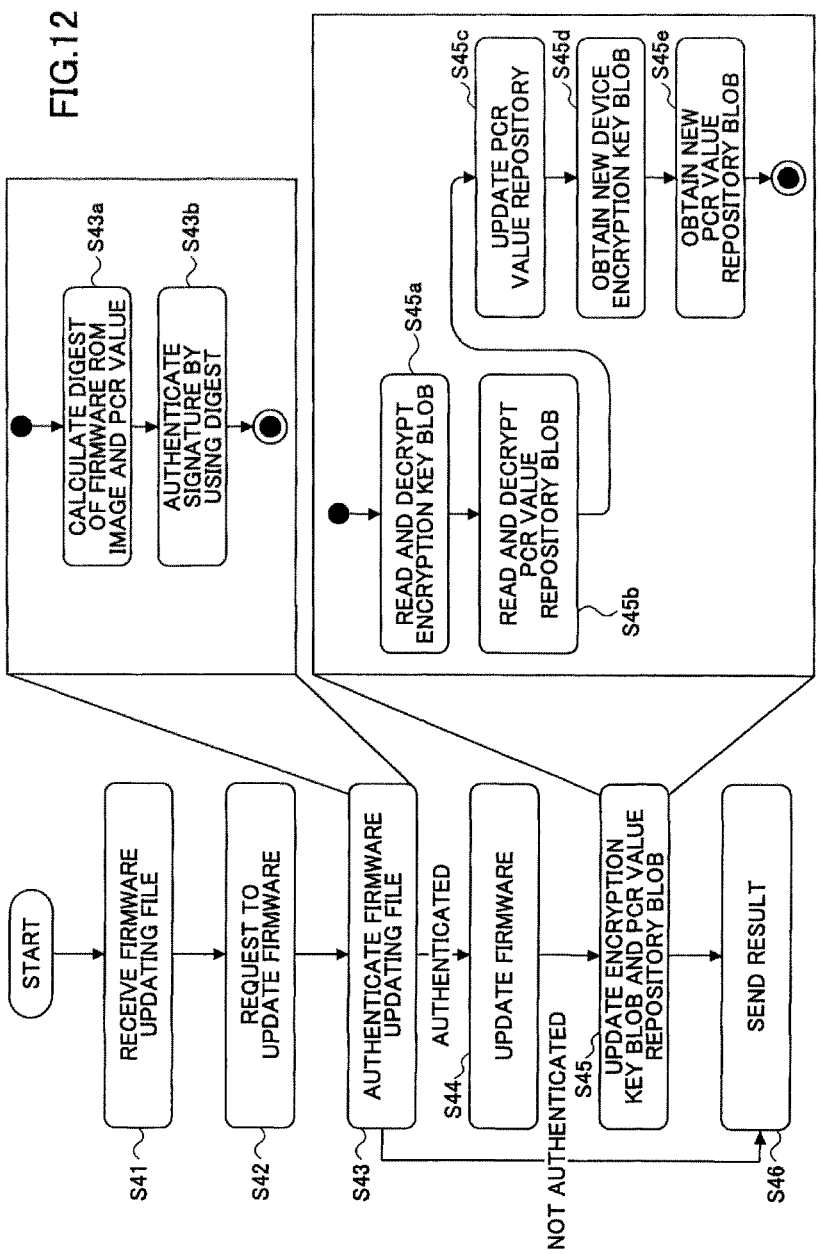
FIG. 12 is a flowchart showing processes for updating firmware via a network by using the first firmware updating file.

FIG. 12 is a flowchart showing processes for updating firmware via a network by using the first firmware updating file 110. Referring to FIG. 12, the processes for updating the firmware via the network by using the first firmware updating file 110 are described.

First, the network updating module 31 receives the first firmware updating file 110 (S41), and requests the system managing module 34 to update firmware (S42).

The system managing module 34 requests the firmware authenticating module 37 to authenticate the first firmware updating file 110. The firmware authenticating module 37 obtains the public key 113 in the falsification unable region (read-only region) of the information processing apparatus. The firmware authenticating module 37 authenticates the first firmware updating file 110 by using the obtained public key 113 (S43).

Specifically, the firmware authenticating module 37 calculates a digest of the firmware ROM image 82 and the PCR value 83 of the first firmware updating file 110 (S43a). The firmware authenticating module 37 decrypts the public key signature 84 in the first firmware updating file 110 by using the public key 113 and collates the decrypted public key signature with the calculated digest. That is, the signature is authenticated by using the digest (43b). With this, the firmware authenticating module 37 authenticates the first firmware updating file 110.

When the first firmware updating file 110 is authenticated, the system managing module 34 requests the system updating module 36 to update firmware. The system updating module 36 updates the firmware by using the first firmware updating file 110 (S44).

The system managing module 34 requests the encryption key managing module 38 to update the encryption key BLOB 70 and the PCR value repository BLOB 111. The encryption key managing module 38 updates the encryption key BLOB 70 and the PCR value repository BLOB 111 by using the PCR value 83 of the first firmware updating file 110 (S45).

Specifically, the encryption key managing module 38 reads the encryption key BLOB 70, decrypts the encryption key BLOB 70 by using the TPM 5, and obtains the device encryption key 71 (345$a$). In addition, the encryption key managing module 38 reads the PCR value repository BLOB 111, decrypts the PCR value repository BLOB 111 by using the TPM 5, and obtains the OCR value repository 112 (S45$b$).

Further, the encryption key managing module 38 updates the PCR value repository 112 to be the PCR value repository 112$a$ by using the PCR value 83 in the first firmware updating file 110 (S45$c$).

The encryption key managing module 38 encrypts again the encryption key BLOB 70 by using the PCR value in the PCR value repository 112$a$, and obtains the (new) encryption key BLOB 70$a$ (45$d$). In addition, the encryption key managing module 38 encrypts again the PCR value repository 112$a$ by using the PCR value in the PCR value repository 112$a$, and obtains the PCR repository BLOB 111$a$ (45$e$).

The system managing module 34 sends a result of the request to the network updating module 31 (S46). The network updating module 31 sends the result to a source that requests to update the firmware. In addition, when the first firmware updating file 110 is not authenticated in S43, the system managing module 34 sends a result of the request to the network updating module 31 (S46). That is, the network updating module 31 sends information that the first firmware updating file 110 is authenticated/not authenticated, and the firmware is updated/not updated.

Figure 13:
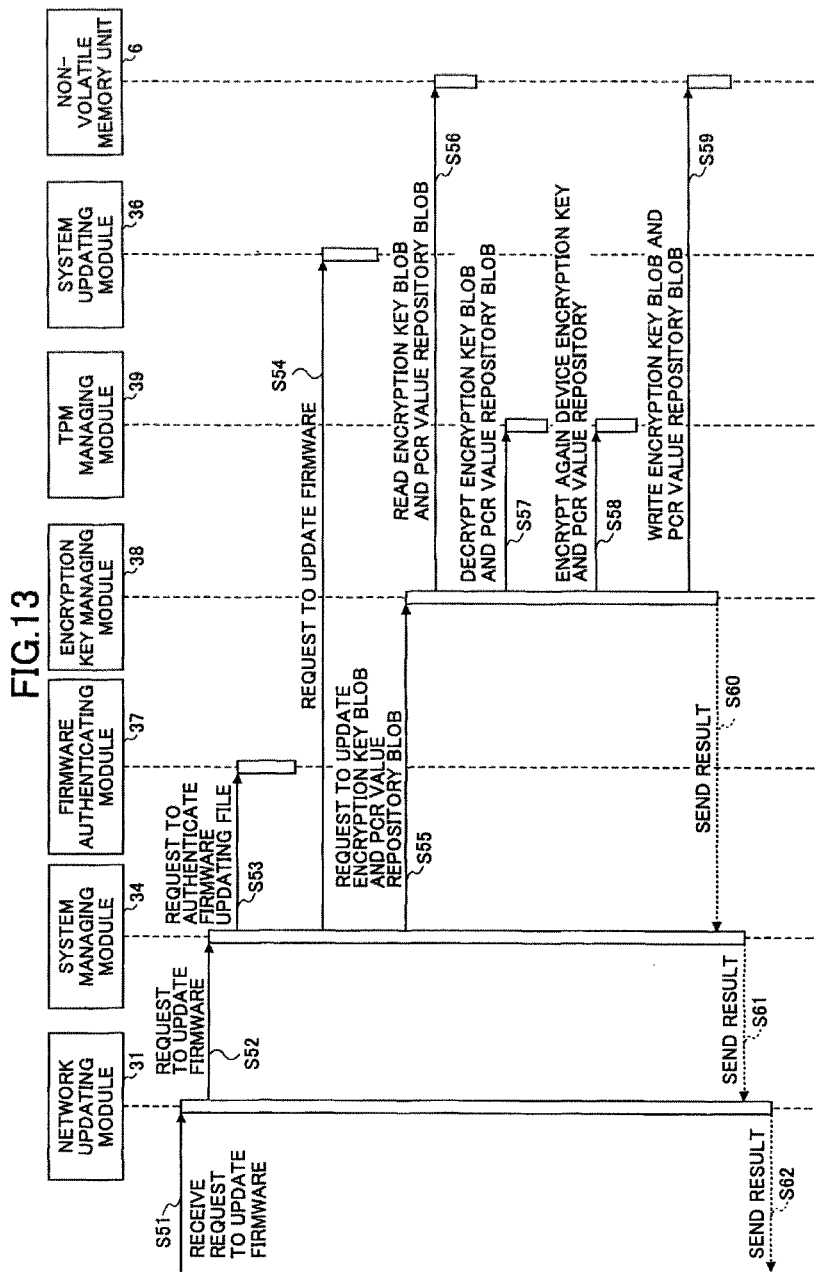
FIG. 13 is a sequence chart showing processes for updating firmware via a network by using the first firmware updating file.

FIG. 13 is a sequence chart showing processes for updating firmware via a network by using the first firmware updating file 110. Referring to FIG. 13, the processes for updating the firmware via the network by using the first firmware updating file 110 are described.

First, the network updating module 31 receives the first firmware updating file 110 which signifies a request to update firmware via a network (S51).

The network updating module 31 requests the system managing module 34 to update the firmware (S52).

The system managing module 34 requests the firmware authenticating module 37 to authenticate the first firmware updating file 110 (S53). The firmware authenticating module 37 authenticates the first firmware updating file 110 by the process described in FIG. 12.

When the first firmware updating file 110 is authenticated, the system managing module 34 requests the system updating module 36 to update firmware (S54). The system updating module 36 updates the firmware by using the first firmware updating file 110.

The system managing module 34 requests the encryption key managing module 38 to update the encryption key BLOB 70 and the PCR value repository BLOB 111 (S55). The encryption key managing module 38 reads the encryption key BLOB 70 and the PCR value repository BLOB 111 from the non-volatile memory unit 6 (S56).

The encryption key managing module 38 decrypts the encryption key BLOB 70 and the PCR value repository BLOB 111 by using the TPM 5. The encryption key managing module 38 updates the PCR value repository 112 to be the PCR value repository 112$a$ by using the PCR value 83 in the first firmware updating file 110 (S57).

The encryption key managing module 38 encrypts again the device encryption key 71 by using the PCR value in the PCR value repository 112$a$, and obtains the (new) encryption key BLOB 70$a$; the encryption key managing module 38 encrypts again the PCR value repository 112$a$ by using the PCR value in the PCR value repository 112$a$, and obtains the PCR repository BLOB 111$a$ (S58).

The encryption key managing module 38 writes the encryption key BLOB 70$a$ and the PCR repository BLOB 111$a$ in the non-volatile memory unit 6 (S59).

The encryption key managing module 38 sends a result of the request for updating firmware to the system managing module 34 (S60).

The system managing module 34 sends the result of the request for updating firmware to the network updating module 31 (S61). The network updating module 31 sends the result to a source that requests to update the firmware (S62).

Figure 14:
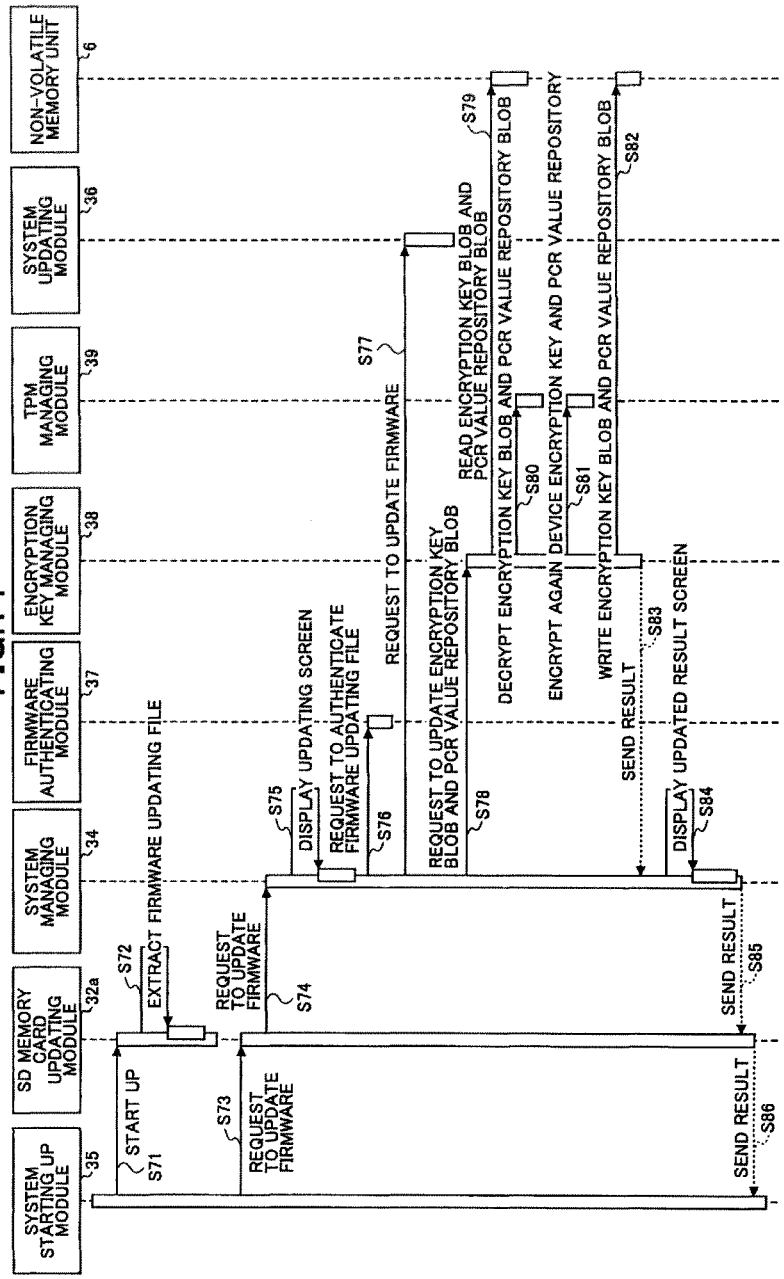
FIG. 14 is a sequence chart showing processes for updating firmware by using an SD memory card.

FIG. 14 is a sequence chart showing processes for updating firmware by using an SD memory card. Referring to FIG. 14, the processes for updating the firmware by using the SD memory card are described.

First, the system starting up module 35 starts up an SD memory card updating module 32$a$ (S71). The SD memory card updating module 32$a$ is one type of the flash media updating module 32. The SD memory card updating module 32$a$ extracts the first firmware updating file 110 from an SD memory card (S72).

The system starting up module 35 requests the SD memory card updating module 32$a$ to update firmware (S73). The SD memory card updating module 32$a$ requests the system managing module 34 to update the firmware (S74).

The system managing module 34 displays an updating screen on, for example, a display (S75). On the updating screen, the progress of the update of the firmware is displayed.

The system managing module 34 requests the firmware authenticating module 37 to authenticate the first firmware updating file 110 (S76). The firmware authenticating module 37 authenticates the first firmware updating file 110 by the process described in FIG. 12.

When the first firmware updating file 110 is authenticated, the system managing module 34 requests the system updating module 36 to update firmware (S77). The system updating module 36 updates the firmware by using the first firmware updating file 110.

The system managing module 34 requests the encryption key managing module 38 to update the encryption key BLOB 70 and the PCR value repository BLOB 111 (S78). The encryption key managing module 38 reads the encryption key BLOB 70 and the PCR value repository BLOB 111 from the non-volatile memory unit 6 (S79).

The encryption key managing module 38 decrypts the encryption key BLOB 70 and the PCR value repository BLOB 111 by using the TPM 5. The encryption key managing module 38 updates the PCR value repository 112 to be the PCR value repository 112$a$ by using the PCR value in the first firmware updating file 110 (S80).

The encryption key managing module 38 encrypts again the device encryption key 71 by using the PCR value in the PCR value repository 112$a$, and obtains the (new) encryption key BLOB 70$a$; the encryption key managing module 38 encrypts again the PCR value repository 112$a$ by using the PCR value in the PCR value repository 112$a$, and obtains the PCR repository BLOB 111$a$ (S81).

The encryption key managing module 38 writes the encryption key BLOB 70a and the PCR repository BLOB 111a in the non-volatile memory unit 6 (S82).

The encryption key managing module 38 sends a result of the request for updating firmware to the system managing module 34 (S83). The system managing module 34 displays an updated result screen on, for example, a display (S84).

The system managing module 34 sends the result of the request for updating firmware to the SD memory card updating module 32a (S85). The SD memory card updating module 32a sends the result to the system starting up module 35 (S86).

Figure 15:
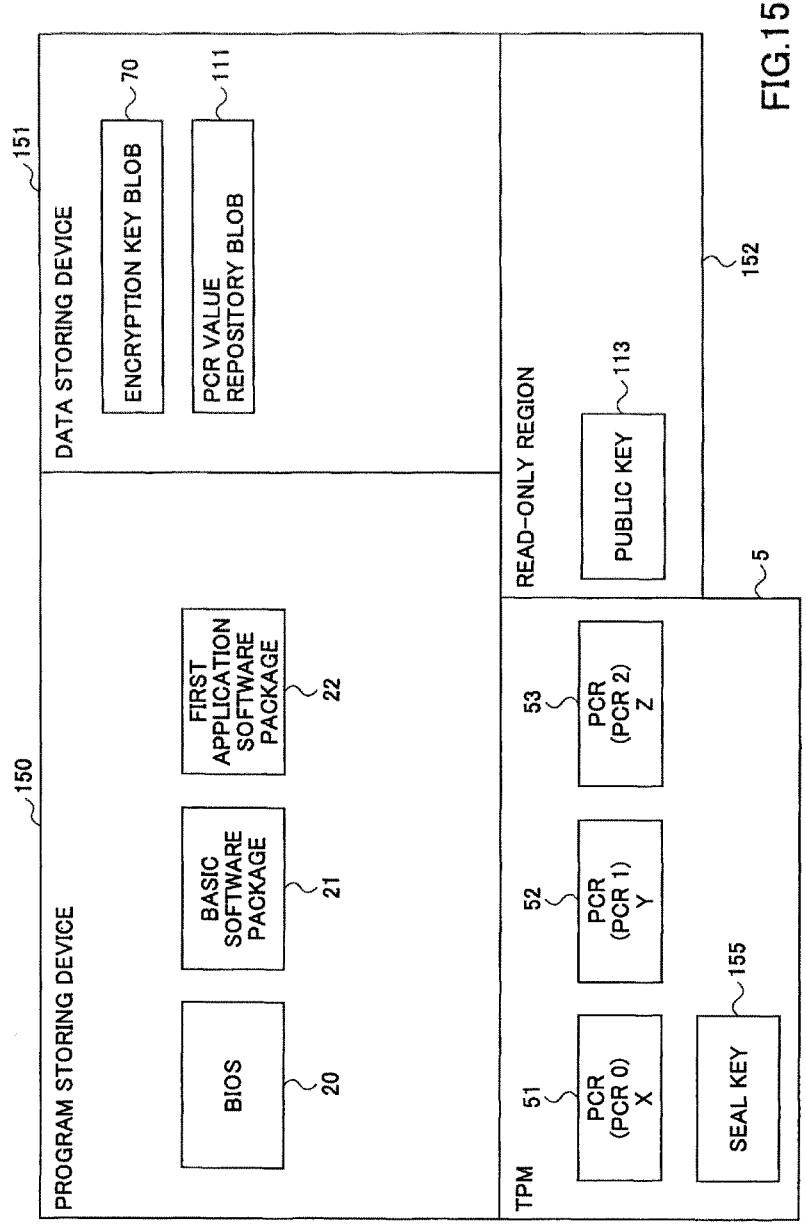
FIG. 15 is a diagram showing a first disposition example of data and programs in the information processing apparatus according to the embodiment of the present invention.

FIG. 15 is a diagram showing a first disposition example of data and programs in the information processing apparatus according to the embodiment of the present invention. As shown in FIG. 15, the BIOS 20, the basic software package 21, and the first application software package 22 are stored in a program storing device 150. The program storing device 150 can be the volatile memory unit 3. The encryption key BLOB 70 and the PCR value repository BLOB 111 are stored in a data storing device 151. The data storing device 151 can be the non-volatile memory unit 6. The PCRs 51 through 53 and a seal key 155 are stored in the TPM 5.

The public key 113 for authenticating firmware is stored in a read-only region of the information processing apparatus. The read-only region can be a read-only non-volatile region of the TPM 5.

A seal key 155 is used when a BLOB is formed. The seal key 155 can be a common key or an asymmetric key. In the seal keys, one key cannot be output from the TPM 5, and another key can be output from the TPM 5 by being encrypted by another secret key.

Figure 16:
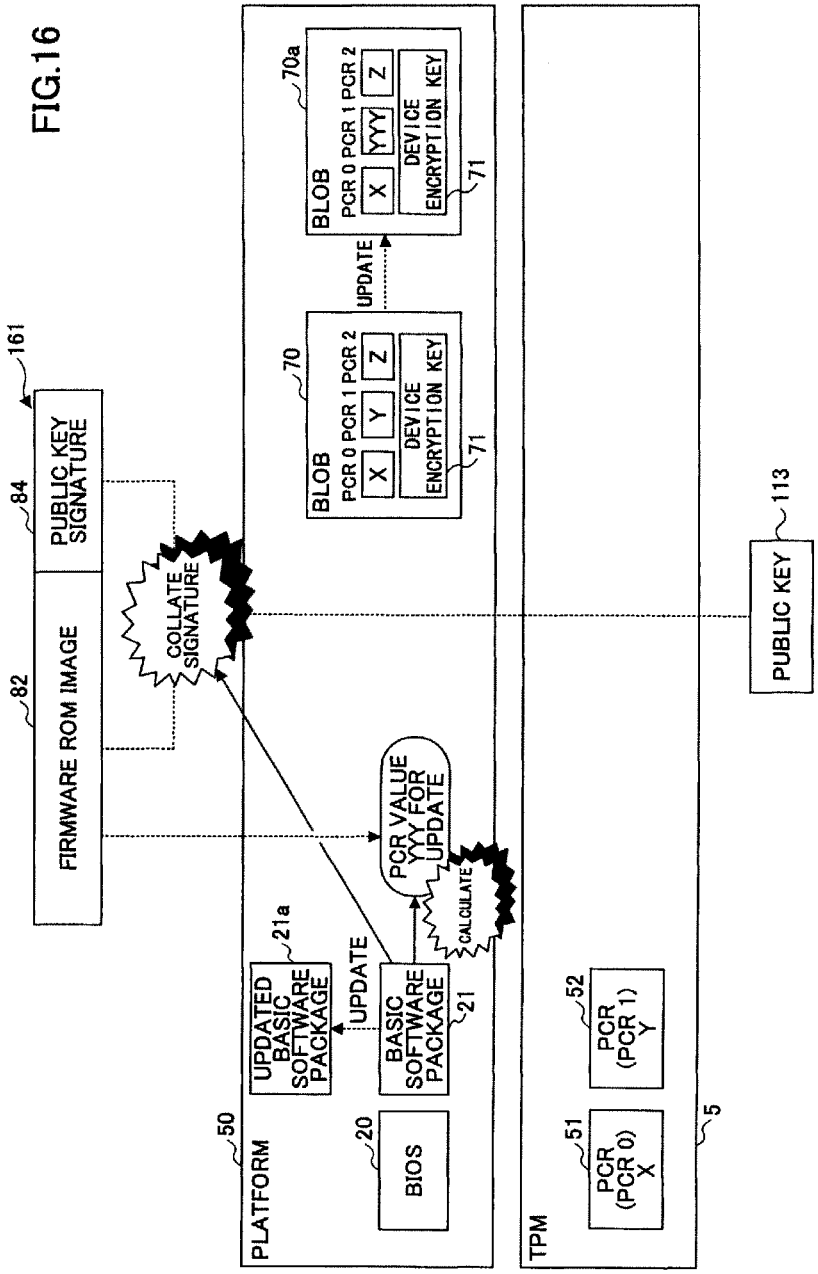
FIG. 16 is a schematic diagram showing processes to update firmware by using a second firmware updating file.

FIG. 16 is a schematic diagram showing processes to update firmware by using a second firmware updating file 161. In FIG. 16, similar to FIG. 11, as an example, the basic software package 21 is updated. In the second firmware updating file 161, the header for firmware 81 is omitted.

As shown in FIG. 16, the second firmware updating file 161 includes the field of the firmware ROM image 82 and the field of the public key signature 84, but does not include the field of the PCR value 83. That is, the second firmware updating file 161 is different from the first firmware updating file 110 shown in FIG. 11.

The field of the firmware ROM image 82 stores new firmware for updating existing firmware, and the field of the public key signature 84 stores a digital signature of the firmware ROM image 82 calculated by a secret key so as to prevent falsification of the second firmware updating file 161.

The second firmware updating file 161 confirms whether the public key signature 84 is valid by using the public key 113 stored in the falsification unable region of the information processing apparatus. When the public key signature 84 is valid, it is determined that the second firmware updating file 161 has not been falsified.

When it is determined that the second firmware updating file 161 has not been falsified, the basic software package 21 is updated to be the updated basic software package 21a by the firmware ROM image 82 of the second firmware updating file 161. When the updated basic software package 21a is formed, the hash value in the PCR 52 of the TPM 5 becomes a hash value of the updated basic software package 21a.

Therefore, the encryption key BLOB 70 and the PCR value repository BLOB 111, which are controlled whether to be decrypted by the hash values in the PCRs 51 and 52, must be encrypted again based on a hash value calculated by the updated basic software package 21a.

In FIG. 16, the PCR value repository BLOB 111, the PCR value repository 112, the PCR value repository 112a, and the PCR value repository BLOB 111a are omitted; however, those are actually provided.

Therefore, in the information processing apparatus, the device encryption key 71 in the encryption key BLOB 70 and the PCR value repository 112 in the PCR value repository BLOB 111 are decrypted by using the TPM 5.

The information processing apparatus encrypts again the device encryption key 71 by using the PCR values calculated from the basic software package 21a and obtains the encryption key BLOB 70a. In addition, the information processing apparatus encrypts again the PCR value repository 112a by using the PCR values in the PCR value repository 112a and obtains a PCR value repository BLOB 111a.

In the processes shown in FIG. 16, when the firmware (the basic software package 21) is updated, since an estimation value of the PCR value can be directly calculated from the firmware, the second firmware updating file 161 does not include the PCR value. In addition, since the estimation value of the PCR value can be calculated in the information processing apparatus, the PCR value can be easily controlled.

Figure 17:
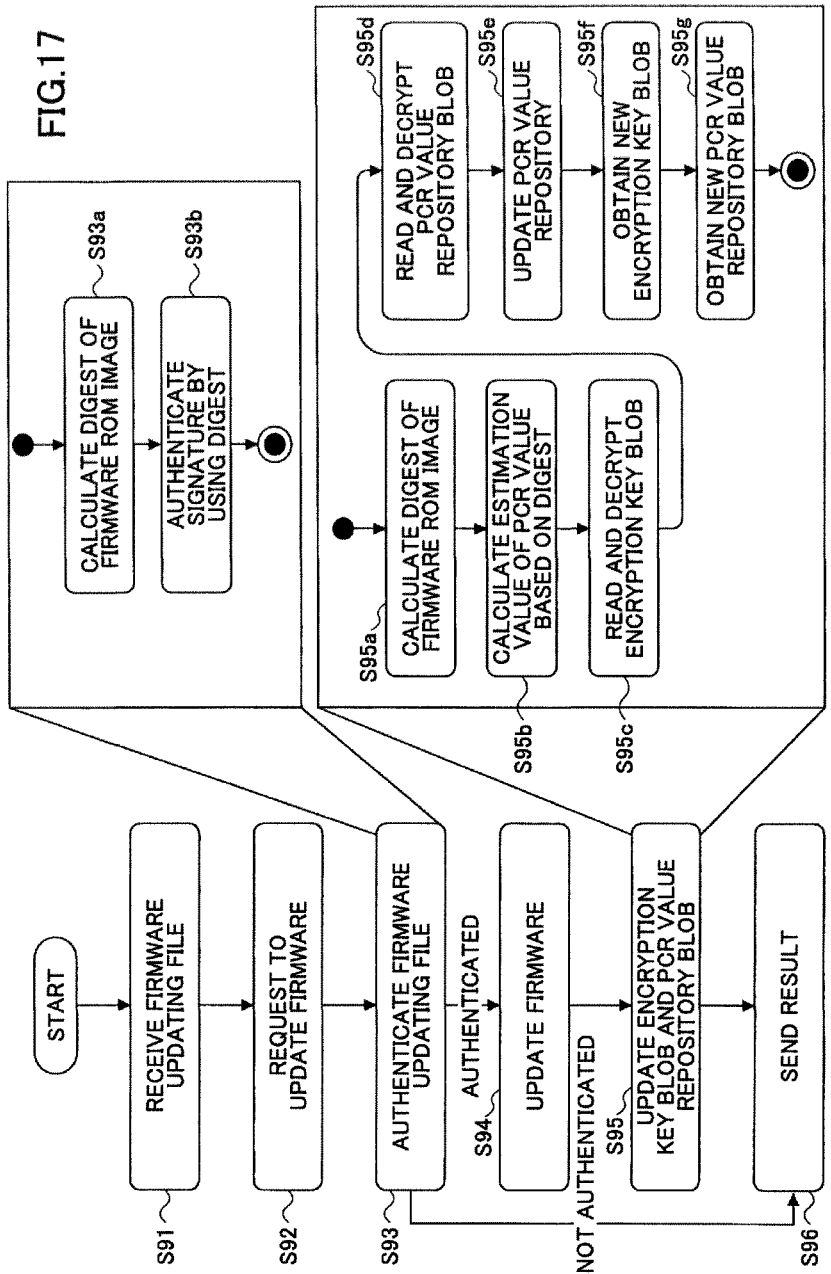
FIG. 17 is a flowchart showing processes for updating firmware via a network by using the second firmware updating file.

FIG. 17 is a flowchart showing processes for updating firmware via a network by using the second firmware updating file 161. Referring to FIG. 17 the processes for updating the firmware via the network by using the second firmware updating file 161 are described.

First, the network updating module 31 receives the second firmware updating file 161 (S91), and requests the system managing module 34 to update firmware (S92).

The system managing module 34 requests the firmware authenticating module 37 to authenticate the second firmware updating file 161. The firmware authenticating module 37 obtains the public key 113 in the falsification unable region (read-only region) of the information processing apparatus. The firmware authenticating module 37 authenticates the second firmware updating file 161 by using the obtained public key 113 (S93).

Specifically, the firmware authenticating module 37 calculates a digest of the firmware ROM image 82 in the second firmware updating file 161 (S93a).

The firmware authenticating module 37 decrypts the public key signature 84 in the second firmware updating file 161 by using the public key 113 and collates the decrypted public key signature with the calculated digest. With this, the firmware authenticating module 37 authenticates the second firmware updating file 161 (S93b).

When the second firmware updating file 161 is authenticated, the system managing module 34 requests the system updating module 36 to update firmware. The system updating module 36 updates the firmware by using the second firmware updating file 161 (S94).

The system managing module 34 requests the encryption key managing module 38 to update the encryption key BLOB 70 and the PCR value repository BLOB 111. The encryption key managing module 38 updates the encryption key BLOB 70 and the PCR value repository BLOB 111 by using the PCR value calculated from the firmware ROM image 82 in the second firmware updating file 161 (S95).

Specifically, the encryption key managing module 38 makes the firmware authenticating module 37 calculate the digest of the firmware ROM image 82 in the second firmware updating file 161 (95a). In addition, the encryption key managing module 38 makes the firmware authenticating module 37 calculate an estimation value of the PCR value base on the digest of the firmware ROM image 82 in the second firmware updating file 161 (95b).

The encryption key managing module 38 reads the encryption key BLOB 70 and decrypts the device encryption key 71 by using the TPM 5 (S95c). In addition, the encryption key managing module 38 reads the PCR value repository BLOB 111 and decrypts the PCR value repository 112 by using the TPM 5 (S95d).

The encryption key managing module 38 updates the PCR value repository 112 to be the PCR value repository 112a by using the estimation value of the PCR value based on the calculated digest of the firmware ROM image (S95e).

The encryption key managing module 38 encrypts again the device encryption key 71 by using the PCR value in the PCR value repository 112a, and obtains the (new) encryption key BLOB 70a (95f). In addition, the encryption key managing module 38 encrypts again the PCR value repository 112a by using the PCR value in the PCR value repository 112a, and obtains the PCR repository BLOB 111a (95g).

The system managing module 34 sends a result of the request to the network updating module 31 (S96). The network updating module 31 sends the result to a source that requests to update the firmware. In addition, when the second firmware updating file 161 is not authenticated in S93, the system managing module 34 sends a result of the request to the network updating module 31 (S96). The network updating module 31 sends a result of the request to the request source. That is, the network updating module 31 sends, for example, information that the second firmware updating file 161 is authenticated/not authenticated, and the firmware is updated/not updated.

Figure 18:
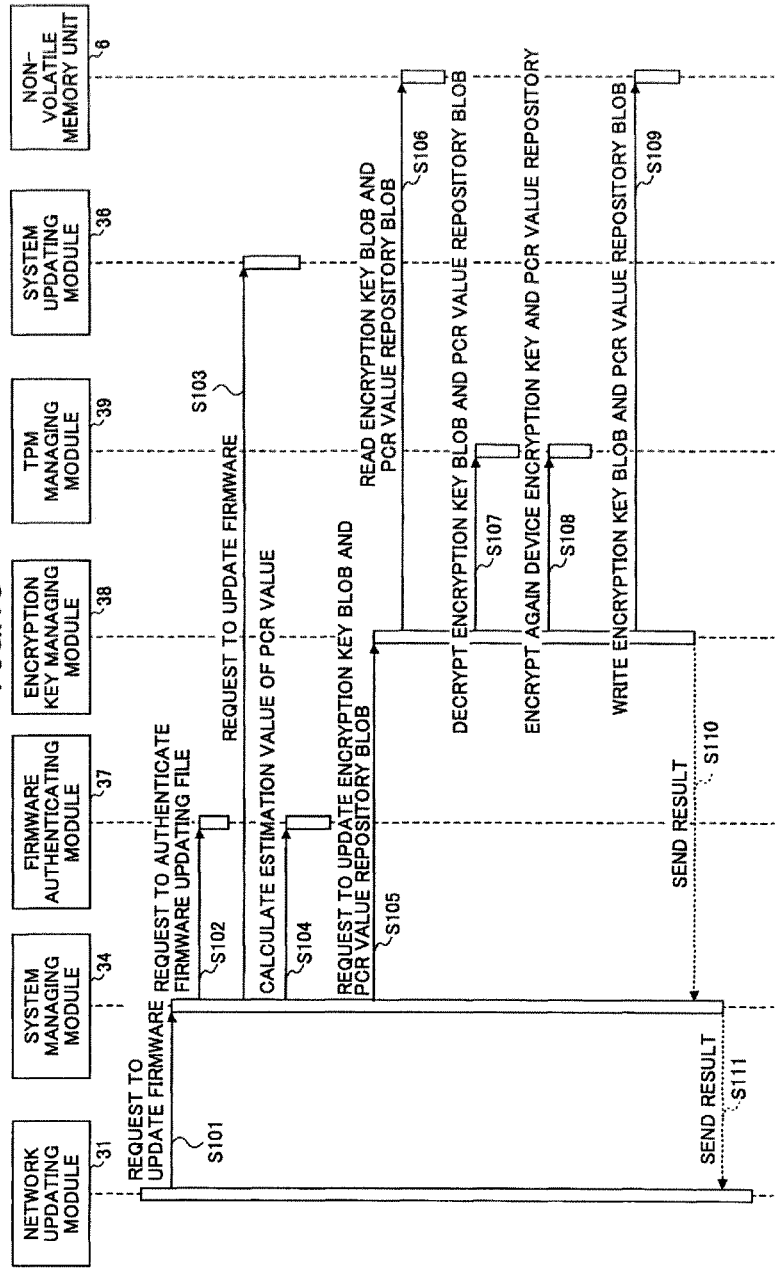
FIG. 18 is a sequence chart showing processes for updating firmware via a network by using the second firmware updating file.

FIG. 18 is a sequence chart showing processes for updating firmware via a network by using the second firmware updating file 161. Referring to FIG. 18, the processes for updating the firmware via the network by using the second firmware updating file 161 are described.

First, the network updating module 31 receives the second firmware updating file 161 which signifies a request to update firmware via a network.

The network updating module 31 requests the system managing module 34 to update the firmware (S101). The system managing module 34 requests the firmware authenticating module 37 to authenticate the second firmware updating file 161 (S102). The firmware authenticating module 37 authenticates the second firmware updating file 161 by the process described in FIG. 12.

When the second firmware updating file 161 is authenticated, the system managing module 34 requests the system updating module 36 to update firmware (S103). The system updating module 36 updates the firmware by using the second firmware updating file 161.

The system managing module 34 makes the firmware authenticating module 37 calculate an estimation value of the PCR value based on the digest of the firmware ROM image (S104).

The system managing module 34 requests the encryption key managing module 38 to update the encryption key BLOB 70 and the PCR value repository BLOB 111 (S105). The encryption key managing module 38 reads the encryption key BLOB 70 and the PCR value repository BLOB 111 from the non-volatile memory unit 6 (S106).

The encryption key managing module 38 decrypts the device encryption key 71 and the PCR value repository 112 by using the TPM 5. The encryption key managing module 38 updates the PCR value repository 112 to the PCR value repository 112a by using the estimation value of the PCR value based on the calculated digest of the firmware ROM image (S107).

The encryption key managing module 38 encrypts again the device encryption key 71 by using the PCR value in the PCR value repository 112a, and obtains the (new) encryption key BLOB 70a; the encryption key managing module 38 encrypts again the PCR value repository 112a by using the PCR value in the PCR value repository 112a, and obtains the PCR repository BLOB 111a (S108).

The encryption key managing module 38 writes the encryption key BLOB 70a and the PCR repository BLOB 111a in the non-volatile memory unit 6 (S109).

The encryption key managing module 38 sends a result of the request for updating firmware to the system managing module 34 (S110).

The system managing module 34 sends the result of the request for updating firmware to the network updating module 31 (S111). The network updating module 31 sends the result to a source that requests to update the firmware (S112).

[Static Authentication Chain]

Figure 19:
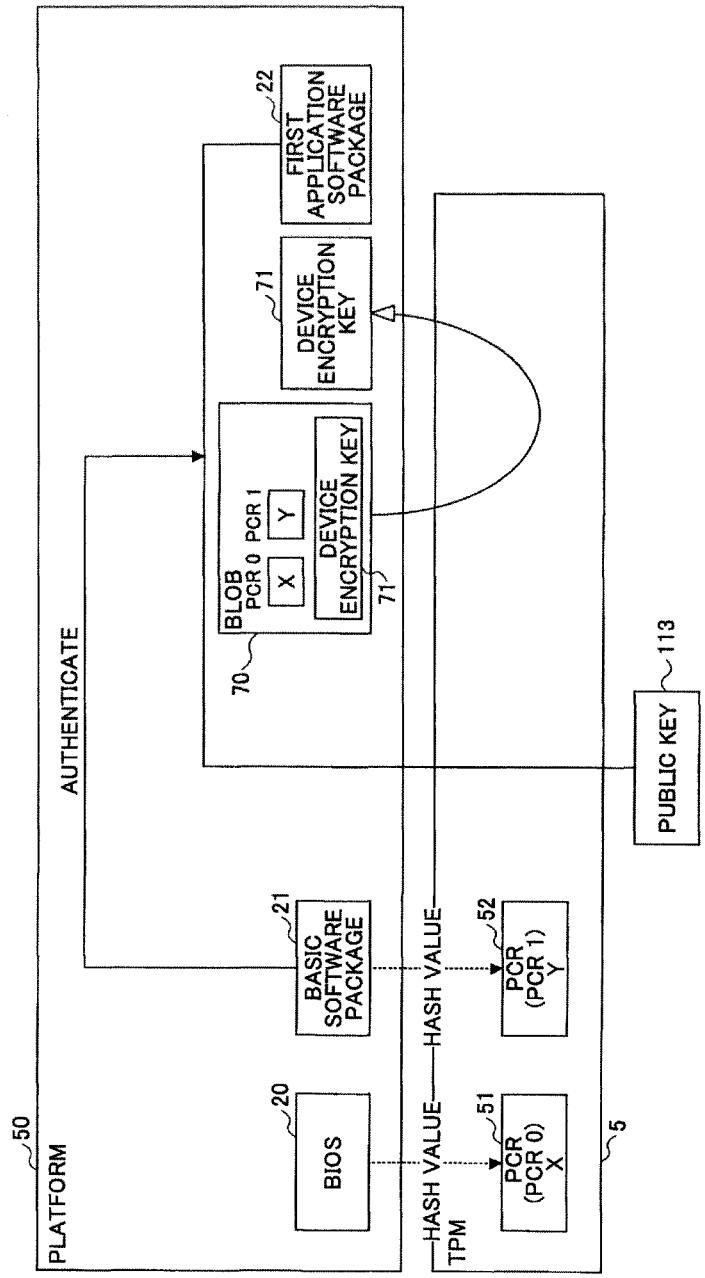
FIG. 19 is a schematic diagram showing a static authentication chain according to the embodiment of the present invention.
Figure 20:
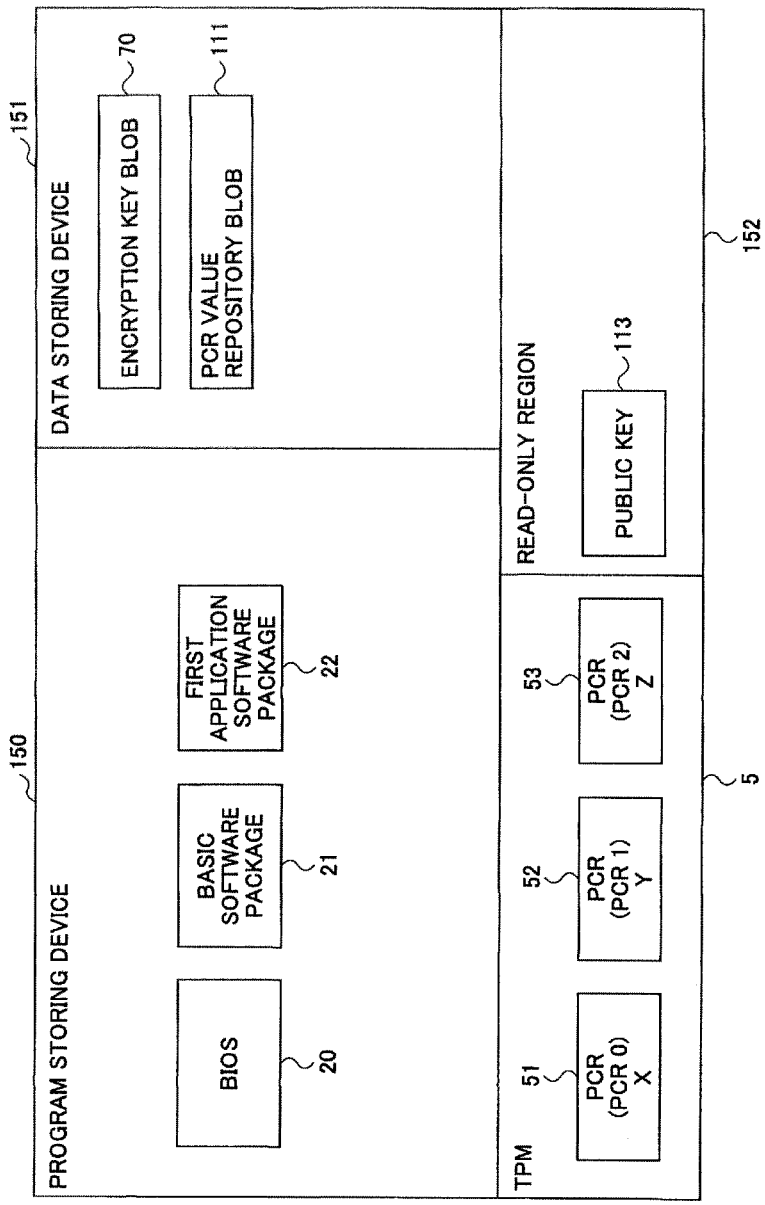
FIG. 20 is a diagram showing a second disposition example of data and programs in the information processing apparatus according to the embodiment of the present invention.

FIG. 19 is a schematic diagram showing a static authentication chain. FIG. 20 is a diagram showing a second disposition example of data and programs in the information processing apparatus according to the embodiment of the present invention.

In the static authentication chain, the first firmware updating file 110 is authenticated by using the public key signature 84 in the first firmware updating file 110.

In the static authentication chain, the first application software package 22 can be executed while maintaining the authentication of the hash value calculated from the firmware even if hash values of firmware other than the basic software package 21 are not registered. Since it is not necessary to wait for registration of hash values of the first application software package 22, the information processing apparatus can be operated at high speed.

In this case, the first application software package 22 and the first firmware updating file 110 including the public key signature B4 are stored in the file system 41 (refer to FIG. 1). When the information processing apparatus is started up, the system starting up module 35 reads the public key 113 for authenticating firmware stored in the falsification unable region, first application software 22 is authenticated by using the public key 113, and the faultlessness of the first application software 22 is confirmed.

[Dynamic Authentication Chain]

Figure 21:
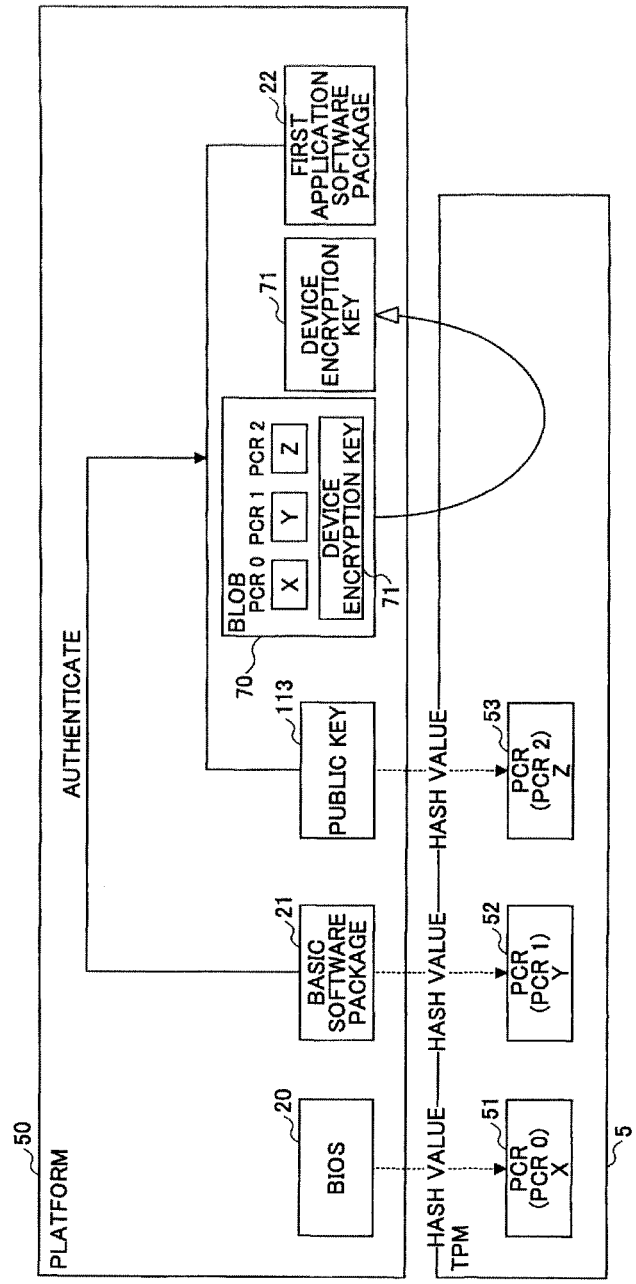
FIG. 21 is a schematic diagram showing a dynamic authentication chain according to the embodiment of the present invention.
Figure 22:
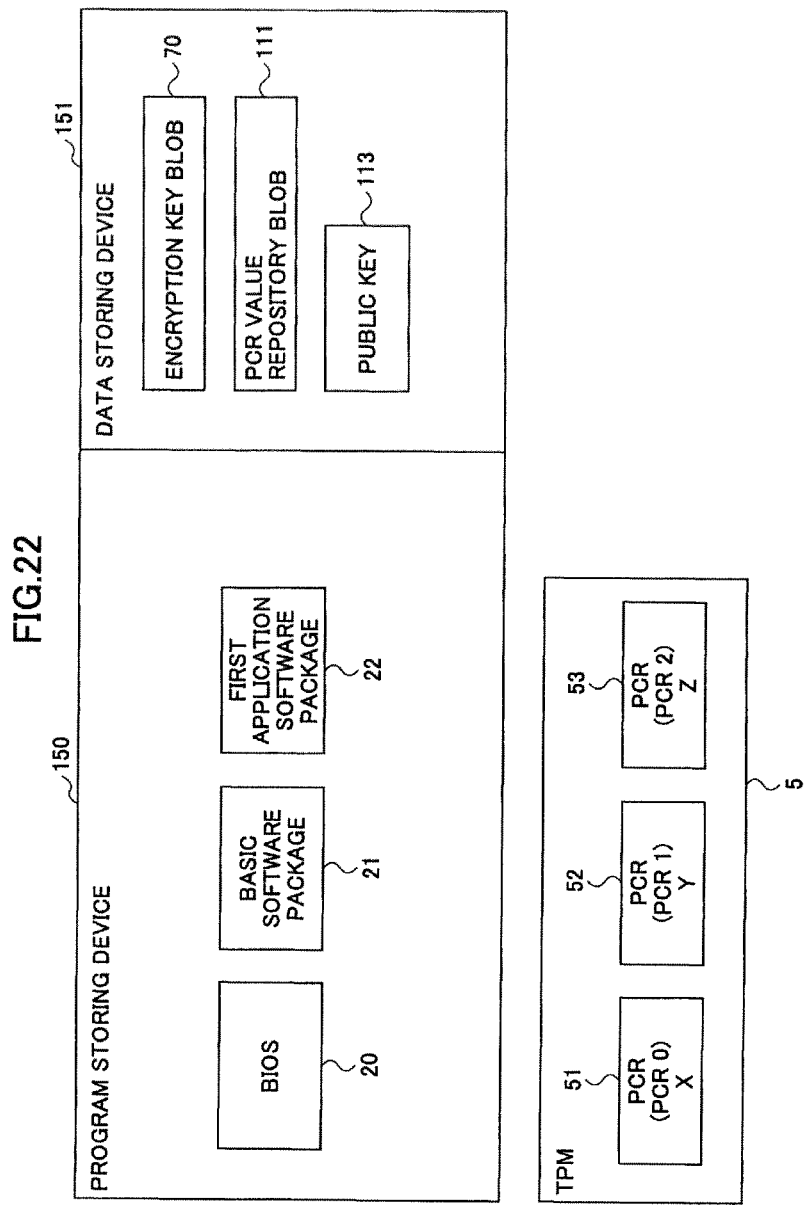
FIG. 22 is a diagram showing a third disposition example of data and programs in the information processing apparatus according to the embodiment of the present invention.

FIG. 21 is a schematic diagram showing a dynamic authentication chain. FIG. 22 is a diagram showing a third disposition example of data and programs in the information processing apparatus according to the embodiment of the present invention.

In the dynamic authentication chain, the public key 113 stored in the falsification unable region is assumed to be a part of the firmware, and the public key 113 is updated by using the firmware updating structure described above.

In FIG. 21, the public key 113 is assumed to be single firmware; when the information processing apparatus is started up, a hash value of the public key 113 is registered in the PCR 53 of the TPM 5. When the dynamic authentication chain is used, the first application software package 22 can be authenticated by using the public key 113 in the file system 41.

The TPM 5 is a module which controls data access based on faultlessness. Specifically, the TPM 5 is a hardware module or a software module which controls the data access by using metrics concerning the faultlessness of firmware.

For example, the TPM 5 realizes the faultlessness metrics by a PCR value calculated from a hash value. In addition, the TPM 5 realizes data access control by determining whether the encryption key BLOB 70 controlled by the PCR value is decrypted.

In the description, the TPM 5 is an encryption and decryption unit, the firmware authenticating module 37 is an authenticating unit, the system updating module 36 is a software updating unit, and the encryption key managing module 38 is an encryption key managing unit.

Further, the present invention is not limited to the specifically disclosed embodiment, and variations and modifications may be made without departing from the scope of the present invention.

The present invention is based on Japanese Priority Patent Application No. 2007-067251, filed on Mar. 15, 2007, with the Japanese Patent Office, the entire contents of which are hereby incorporated herein by reference.

What is claimed is:

1. An information processing apparatus including
an encryption and decryption unit configured to encrypt and decrypt information by using a first value uniquely calculated from software including a plurality of programs;
a memory unit configured to store the information encrypted by the encryption and decryption unit; and
a processing unit configured to execute programs including a basic input/output system (BIOS) and a basic software package, the processing unit executing the basic software package comprising:
a software updating unit configured to update the software; and
an encryption information managing unit configured to decrypt the encrypted information by using the first value, encrypt again the decrypted information by using a second value which is changed based on the update of the software,
wherein the BIOS, when executed by the processing unit upon startup of the apparatus, calculates a hash value of the BIOS itself and then the BIOS also calculates a hash value of the basic software package,
the encryption and decryption unit registers the hash value of the BIOS and the hash value of the basic software package, as the first value in the startup process of the apparatus,
the encryption and decryption unit performs the decrypting of the encrypted information, which was encrypted by using the first value in the memory unit after the hash value of the BIOS and the hash value of the basic software package were calculated and registered as the first value in the startup process of the apparatus, by using the hash value of the BIOS and the hash value of the basic software package registered by the encryption and decryption unit in the startup process of the apparatus.

2. The information processing apparatus as claimed in claim 1, wherein the encryption information managing unit is configured to encrypt again the decrypted information by using a set including (i) the second value which is changed, from the first value, based on the update of the software, and (ii) a value which is not changed based on the update of the software.

3. The information processing apparatus as claimed in claim 1, wherein
the software updating unit updates the software by using a software updating file that includes software update to be applied by the software updating unit, and
the software updating file further includes the second value calculated based on the software update, and the second value replaces the first value in the memory unit.

4. The information processing apparatus as claimed in claim 1, wherein
the memory unit includes a first encrypted information part and a second encrypted information part, and
the encryption and decryption unit encrypts the information by using the first value to obtain a first encrypted version of the information, and causes the first encrypted version of the information to be stored in the first encrypted information part of the memory unit, and
the encryption information managing unit encrypts the information by using the second value to obtain a second encrypted version of the information, and causes the second version of the information to be stored in the first encrypted information part of the memory unit in place of the first version of the information.

5. The information processing apparatus as claimed in claim 1, wherein
the memory unit includes a first encrypted information part and a second encrypted information part, and
the encryption information managing unit causes a first version of a repository registering the first value and having been encrypted by using the first value, to be stored in the second encrypted information part of the memory unit, and
the encryption information managing unit registers the second value in place of the first value in the repository, encrypts a second version of the repository registering the second value, by using the second value, and causes the second encrypted version of the repository registering the second value to be stored in place of the first version of the repository registering the first value, in the second encrypted information part of the memory unit.

6. A method performed by an information processing apparatus including a memory unit and a processing unit that executes one or more programs of instructions stored in a non-transitory computer-readable medium, to update software in the apparatus, the programs including a basic input/output system (BIOS) and a basic software package, the method comprising:
(a) storing a first value uniquely calculated from the software, in the memory unit;
(b) encrypting information by using the first value to obtain a first encrypted version of the information, and storing the first encrypted version of the information, encrypted by using the first value, in the memory unit;
(c) updating the software;
(d) decrypting the first encrypted version of the information to obtain the information unencrypted;
(e) encrypting the information obtained in (d), to obtain a second encrypted version of the information, by using a second value which is determined based on the updated software;
(f) causing the second encrypted version of the information to be stored in place of the first encrypted version of the information, in the memory unit;
(g1) executing the BIOS upon startup of the apparatus to calculate a hash value of the BIOS itself and then to calculate a hash value of the basic software package; and
(g2) registering the hash value of the BIOS and the hash value of the basic software package, as the first value in the startup process of the apparatus,
wherein (b) is performed after the hash value of the BIOS and the hash value of the basic software package are registered in (a) as the first value in the startup process of the apparatus, and
the decrypting of the encrypted information, which was encrypted in (b) by using the first value, is performed in (d) by using the hash value of the BIOS and the hash value of the basic software package registered in (g2) in the startup process of the apparatus.

7. The method as claimed in claim 6, wherein the second encrypted version of the information is obtained in (e) by encrypting the information by using a set including (i) the second value which is changed, from the first value, based on the update of the software, and (ii) a value which is not changed based on the update of the software.

8. The method as claimed in claim 6, wherein
the software is updated in (c) by using a software updating file that includes software update to be applied by the software updating unit, and
the software updating file further includes the second value calculated based on the software update, and wherein
the method further comprises causing the second value to be stored in place of the first value in the memory unit.

9. The method as claimed in claim 6, further comprising:
encrypting a repository registering the first value, by using the first value, to obtain a first encrypted version of the repository registering the first value, and causing the first encrypted version of the repository registering the first value, to be stored in the memory unit;
decrypting the first encrypted version of the repository to obtain the repository unencrypted;
registering the second value in place of the first value in the repository; and
encrypting the repository registering the second value, by using the second value, to obtain a second encrypted version of the repository registering the second value, and causing the second encrypted version of the repository registering the second value, to be stored in place of the first version of the repository registering the first value, in the memory unit.

10. A non-transitory computer-readable medium embodying one or more programs of instructions executable by a computer that includes a memory unit and a processing unit, to perform a method to update software in the apparatus, the method comprising:
(a) storing a first value uniquely calculated from the software, in the memory unit;
(b) encrypting information by using the first value to obtain a first encrypted version of the information, and storing the first encrypted version of the information, encrypted by using the first value, in the memory unit;
(c) updating the software;
(d) decrypting the first encrypted version of the information to obtain the information unencrypted;
(e) encrypting the information obtained in (d), to obtain a second encrypted version of the information, by using a second value which is determined based on the updated software;
(f) causing the second encrypted version of the information to be stored in place of the first encrypted version of the information, in the memory unit;
(g1) executing the BIOS upon startup of the apparatus to calculate a hash value of the BIOS itself and then to calculate a hash value of the basic software package; and
(g2) registering the hash value of the BIOS and the hash value of the basic software package, as the first value in the startup process of the apparatus,
wherein (b) is performed after the hash value of the BIOS and the hash value of the basic software package are registered in (a) as the first value in the startup process of the apparatus, and
the decrypting of the encrypted information, which was encrypted in (b) by using the first value, is performed in (d) by using the hash value of the BIOS and the hash value of the basic software package registered in (g2) in the startup process of the apparatus.

* * * * *